US007839252B2

(12) United States Patent
Heinrich et al.

(10) Patent No.: US 7,839,252 B2
(45) Date of Patent: Nov. 23, 2010

(54) SPOOL, BRAKE AND ELECTRIC MOTOR

(75) Inventors: Pascal Heinrich, Rountzenheim (FR); Gerhard Flörchinger, Harthausen (DE); Laurent Criqui, Staatsangehörigkeit (FR); Jean-Pierre Lambling, Staatsangehörigkeit (FR); Gerd Schüler, Staatsangehörigkeit (DE)

(73) Assignee: Sew-Eurodrive GmbH & Co. KG, Bruchsal (DE)

(*) Notice: Subject to any disclaimer, the term of this patent is extended or adjusted under 35 U.S.C. 154(b) by 744 days.

(21) Appl. No.: 11/579,774

(22) PCT Filed: Apr. 4, 2005

(86) PCT No.: PCT/EP2005/003515

§ 371 (c)(1), (2), (4) Date: Nov. 6, 2006

(87) PCT Pub. No.: WO2005/109606

PCT Pub. Date: Nov. 17, 2005

(65) Prior Publication Data

US 2007/0222312 A1 Sep. 27, 2007

(30) Foreign Application Priority Data

May 4, 2004 (EP) ...................... 10 2004 022 254

(51) Int. Cl.

| | |
|---|---|
| ***H01F 27/30*** | (2006.01) |
| ***H02K 7/10*** | (2006.01) |
| ***H02K 49/00*** | (2006.01) |
| ***H02K 23/40*** | (2006.01) |
| ***B60L 7/00*** | (2006.01) |
| ***B65D 19/28*** | (2006.01) |
| ***B65H 75/14*** | (2006.01) |
| ***F16D 19/00*** | (2006.01) |

(52) U.S. Cl. ......................... 336/198; 310/76; 310/77; 310/92; 310/93; 310/194; 188/161; 242/586; 242/586.2; 242/586.3; 242/614; 192/84.9; 192/84.961; 336/208

(58) Field of Classification Search ...................... None
See application file for complete search history.

(56) References Cited

U.S. PATENT DOCUMENTS 3,461,413 A * 8/1969 Wood et al. ............... 336/84 R (Continued)

FOREIGN PATENT DOCUMENTS

DE 2236241 * 7/1972

(Continued)

OTHER PUBLICATIONS

International Search Report, PCT International Patent Application No. PCT/EP2005/003515, Apr. 4, 2005.

(Continued)

*Primary Examiner*—Anh T Mai
*Assistant Examiner*—Mangtin Lian
(74) *Attorney, Agent, or Firm*—Kenyon & Kenyon LLP

(57) ABSTRACT

A spool includes at least one bobbin and one winding wire, e.g., a winding wire lacquered for electrical insulation, the bobbin including at least one channel, e.g., one arranged as a pocket, at least one sleeve being electrically connected to the winding wire, the sleeve being electrically connected to an electrical line, e.g., a stranded conductor of a cable, the sleeve including deformable regions, for producing the electrical connections, a respectively deformable region being deformable such that a force-locking connection is provided and welding is able to be carried out.

30 Claims, 31 Drawing Sheets

U.S. PATENT DOCUMENTS

| | | | | | |
|---|---|---|---|---|---|
| 4,588,973 | A | * | 5/1986 | Grah et al. | 336/192 |
| 4,633,110 | A | | 12/1986 | Genco et al. | |
| 4,699,444 | A | * | 10/1987 | Isohata | 439/839 |
| 4,720,646 | A | | 1/1988 | Torimoto | |
| 4,728,916 | A | * | 3/1988 | Fontecchio et al. | 335/255 |
| 4,908,593 | A | * | 3/1990 | Takayanagi | 335/255 |
| 4,918,419 | A | * | 4/1990 | Ida | 336/192 |
| 5,451,736 | A | | 9/1995 | Fiedler et al. | |
| 5,569,046 | A | | 10/1996 | Pfetzer | |
| 6,252,485 | B1 | * | 6/2001 | Lin | 336/192 |
| 2002/0093411 | A1 | * | 7/2002 | Lewin et al. | 336/192 |
| 2003/0020344 | A1 | | 1/2003 | Futami et al. | |
| 2004/0252003 | A1 | * | 12/2004 | Linkner et al. | 336/208 |

FOREIGN PATENT DOCUMENTS

| | | | | |
|---|---|---|---|---|
| DE | 22 36 241 | | | 2/1974 |
| DE | 2236241 | | * | 2/1974 |
| DE | 2236241 | A1 | * | 2/1974 |
| DE | 8026597 | | * | 3/1980 |
| DE | 79 23 585 | | | 7/1980 |
| DE | 8026597 | | * | 10/1980 |
| DE | 80 26 597 | | | 1/1981 |
| DE | 82 34 030 | | | 5/1984 |
| DE | 34 07 758 | | | 9/1985 |
| DE | 36 13 294 | | | 10/1987 |
| EP | 0 587 617 | | | 3/1994 |
| GB | 2 050 066 | | | 12/1980 |
| WO | WO 95/15019 | | | 6/1995 |

OTHER PUBLICATIONS

Translation of International Preliminary Report on Patentability from International Application No. PCT/EP2005/003515, Dec. 14, 2006.

Translation of Written Opinion of the International Searching Authority, PCT International Patent Application No. PCT/EP2005/003515, Apr. 4, 2005.

* cited by examiner

SPOOL, BRAKE AND ELECTRIC MOTOR

FIELD OF THE INVENTION

The present invention relates to a spool, a brake and an electric motor.

BACKGROUND INFORMATION

Certain bobbins for spools wound with winding wires are conventional.

A brake coil having a center tap (FIG. 4, reference numeral 6) is described in German Published Patent Application No. 36 13 294, which is usable as a brake for an electric motor. It is a disadvantage, in this case, that manufacturing it is effortful and costly. It is important, in this context, that each additional contact of the winding wire causes effort and costs during manufacturing.

The connecting of wire is described in German Published Patent Application No. 79 23 585, the winding wire of the spool having to be wound around the pin-shaped end several times ("wind around" page 4, 3$^{rd}$ paragraph, lines 4-5) and then soldered on. This requires too much effort and is costly.

A hook on a connecting piece is described in German Published Patent Application No. 34 07 758, which is provided to guard against pulling out (E2, page 9, line 11). It is a disadvantage, again, that connecting the winding wire requires much effort and is complicated.

SUMMARY

Example embodiments of the present invention may provide a spool so as to make it more cost-effective and simpler to manufacture, especially including contacting. This also relates particularly to spools having a plurality of taps, especially at least one center tap.

The spool may include at least one bobbin and one winding wire, e.g., a winding wire lacquered or enameled for electrical insulation, the bobbin including at least one channel, e.g., one developed as a pocket, at least one sleeve, bush or bushing being electrically connected to the winding wire, the sleeve being electrically connected to an electrical line, e.g., a stranded conductor of a cable, the sleeve including deformable regions, for producing the electrical connections, a respectively deformable region being deformable such that a force-locking connection is provided and welding is able to be carried out.

The sleeve may make possible a cost-effective type of electrical connection. For example, the sleeve itself is able to be produced as a cost-effective punched bent component made of sheet metal. Since it has deformable regions, using these regions, winding wire sections or stranded conductor sections are able to be clamped, that is, able to be connected by force-locking. Welded joints are then able to be produced by appropriate heating. Using additional deformable regions, other parts of the cable are also able to be clamped, which makes strain relief implementable for the cable having the stranded conductor.

The sleeve may include at least one first support region which is provided as support and/or guidance for the winding wire, the sleeve including at least one second region, arranged as a tab, which is deformable for the force-locking connection to the winding wire and is providable for producing a welded joint to the winding wire, the sleeve including at least one third region, e.g., a wall part region, which is provided for a welded joint to the stranded conductor of a cable.

The winding wire may be easy to thread in and then may lie on the support surface, that is, it is able to be accurately positioned. In this manner, the threading is able to be carried out so well by the shaping of the sleeve that the winding wire is introduced into the second region, that is, the region of the deformable tab. The latter is deformable, that is, it is particularly easily pressed against a wall part for clamping, that is, the force-locking connection of the winding wire to the sleeve. But then, the clamped winding wire is able to be quickly and simply welded. The welded joint is well protected against stressing forces, because the force-locking connection continues to be effective, and thus unloads the welded joint.

Since the sleeve has an additional region for a welded joint to the stranded conductor of the cable, at the sleeve itself, a stable region is realized that is suitable for a welded joint, and consequently no further additional parts are required for the welded joint of the stranded conductor of the cable.

The sleeve may be a metallic punched bent component. For example, the sleeve may be suitably provided for producing an electrical connection between the winding wire and the electrical line or a stranded conductor. This may provide that a conductive metal and a metal that is especially suitable for producing a welded joint may be selected, and which is also cost-effective and is able to be manufactured by a punching and bending process.

The sleeve may be able to be fastened in the bobbin with force-locking and/or form-locking. For example, the sleeve may include at least one barb, especially for hooking into the channel. This may provide that the fastening is able to be achieved simply and cost-effectively.

The sleeve may include at least one first region, especially a region developed as a tab, which is provided as a support and/or guidance for the winding wire. This may provide that manufacturing faults may be minimized, since the winding wire is able to be positioned securely and reproducibly, with great accuracy.

The sleeve may include at least one second region, especially a region designed as a tab, which is deformable for the force-locking connection to the winding wire and is providable for producing a welded joint to the winding wire. This may provide that a good electrical connection is providable, simply and cost-effectively.

The sleeve may include at least one third region, especially a region designed as a tab, which is deformable for the force-locking connection to a stranded connector, especially of a cable, and is providable for producing a welded joint to the stranded connector. This may provide that a good electrical connection is providable, simply and cost-effectively.

The sleeve may include at least one fourth region, especially a region designed as a tab, which is deformable for the force-locking connection to a cable, e.g., to the insulation of the cable, and is providable for producing a welded joint to the stranded connector. This may provide that a strain relief is providable, simply and cost-effectively.

The lacquering of the winding wire may be removable when producing a welded joint at least in the vicinity of the electrical contact area, e.g., because of the heating that occurs during the production of the welded joint. This may provide that no special stripping operating step is required, but just the welding may be sufficient.

The regions may be connected at a wall part. This may provide that the regions are able to be held together in a stable manner, using the wall part.

The spool may include a center tap. This may provide for being able to realize particularly rapidly switchable brakes.

The spool may include encapsulating material, e.g., in the area of the channel and/or the winding. This may provide that chemical and mechanical protection is achievable. Besides that, the electrical insulating values are also able to be improved, in response to a suitable choice of the encapsulating material.

The bobbin may include a holding device for winding wire and/or cable. This may provide that the holding device is able to be produced already at the injection molding production of the bobbin, and thus no further operation may be required.

With regard to the brake, the brake coil may be arranged in the manner of the above-named spool. Thus, a cost-effective brake coil may be able to be implemented even having a center tap. Three sleeves are required for the center tap, using which, stranded connector at the beginning, in the middle and at the end of the winding of the spool, that is executed using winding wire, is tapped.

An electric motor may include a brake having a brake coil or a spool as described above. This may provide that the electric motor is able to be manufactured with low effort and costs, and a high degree of automation may be able to be achieved in the manufacturing.

LIST OF REFERENCE NUMERALS

1 sleeve
2 bobbin
3 stranded conductor having insulation
4 channel
5 winding wire
6 holding device
7 holding device having an eyelet for cable
8 holding device
9 slot
10 corner
20 tab
21 barb
22 tab
23 wall part
24 tab
25 tab
101 sleeve
102 bobbin
103 cable, including stranded connector and insulation
105 winding wire
108 holding device
120 wall part area
122 tab
123 wall part
124 tab
125 support surface for winding wire Example embodiments of the present invention are explained in more detail below with reference to the appended Figures.

DETAILED DESCRIPTION

Figure 12:
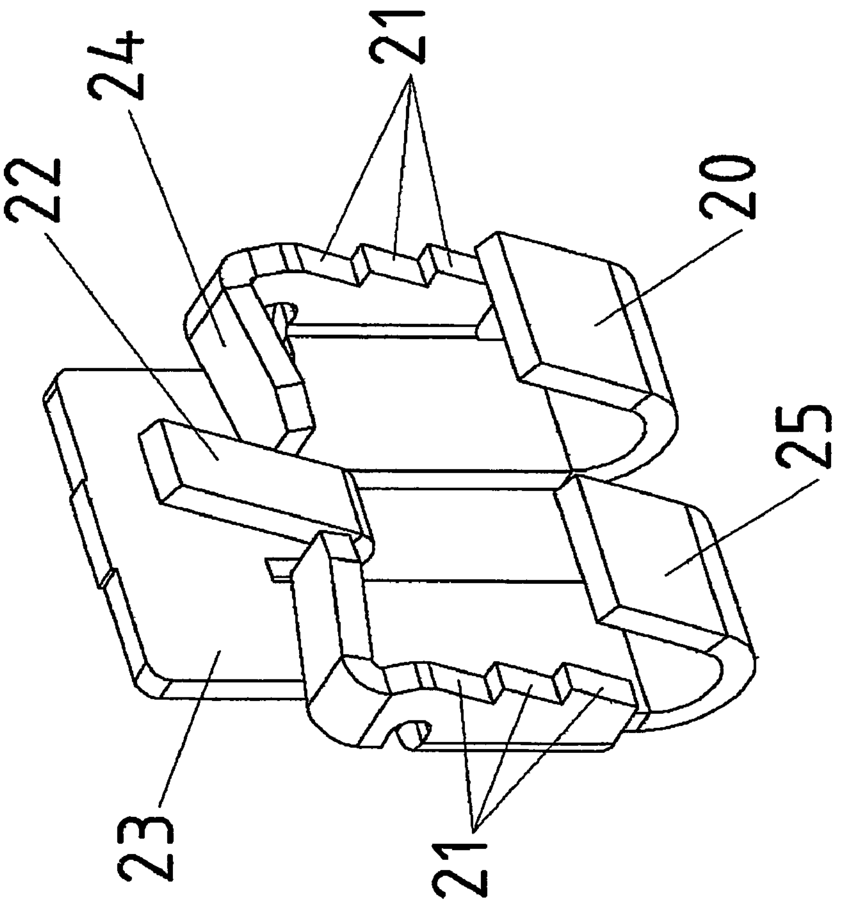

The construction of sleeves 1 are illustrated in FIGS. 12 and 13.

Figure 1:
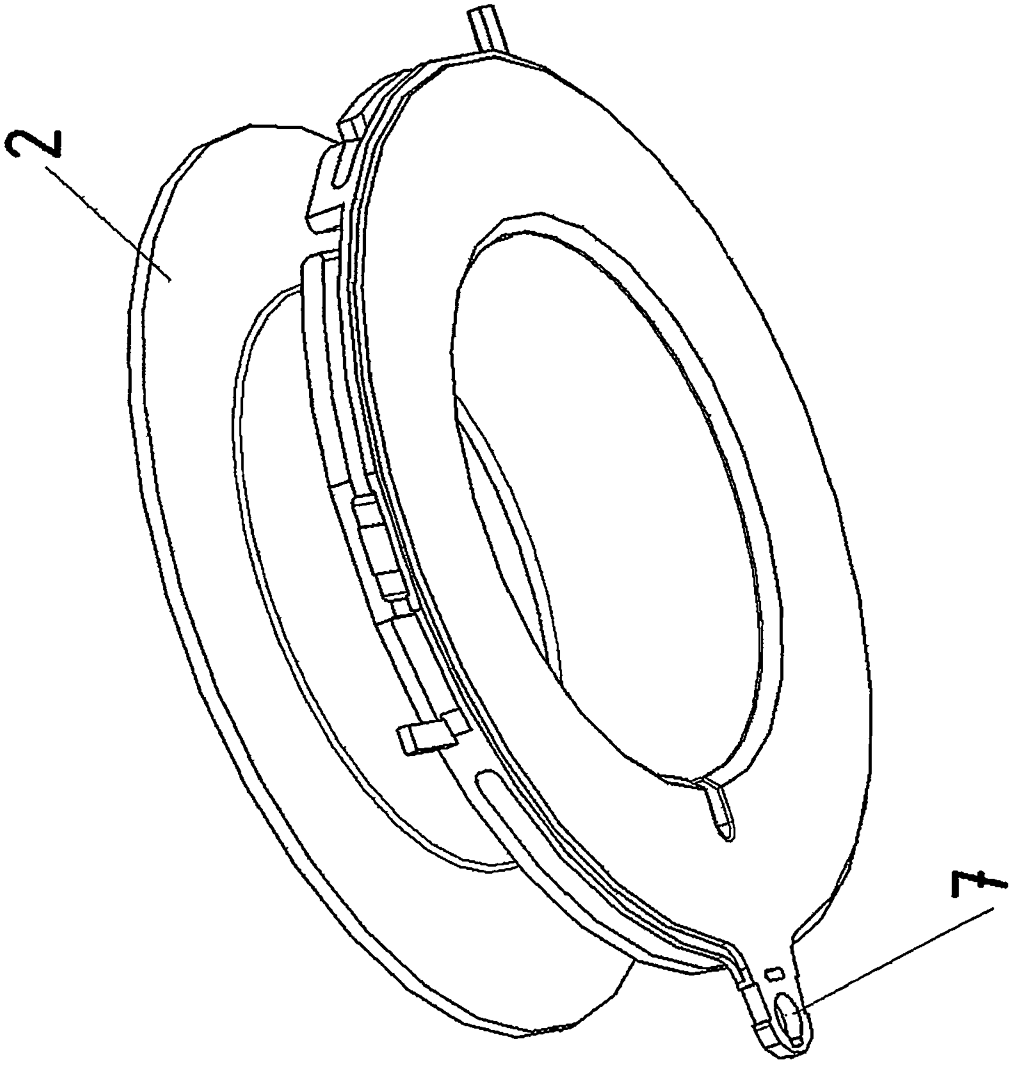
FIG. 1 illustrates a bobbin 2. It may be able to be made as a plastic injection-molded part, and has a holding device 7 as fastening for an outgoing cable.
Figure 2:
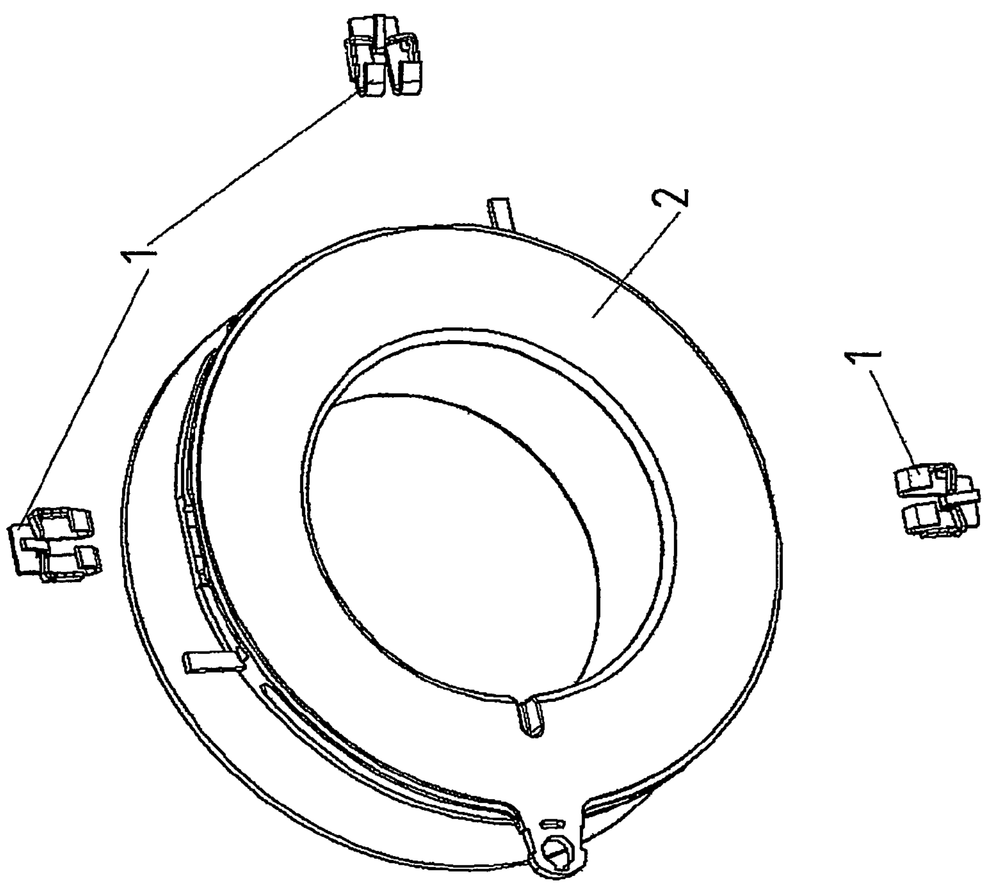
FIG. 2 illustrates three sleeves 1, which are able to be introduced into the bobbin at three places on the circumference.
Figure 3:
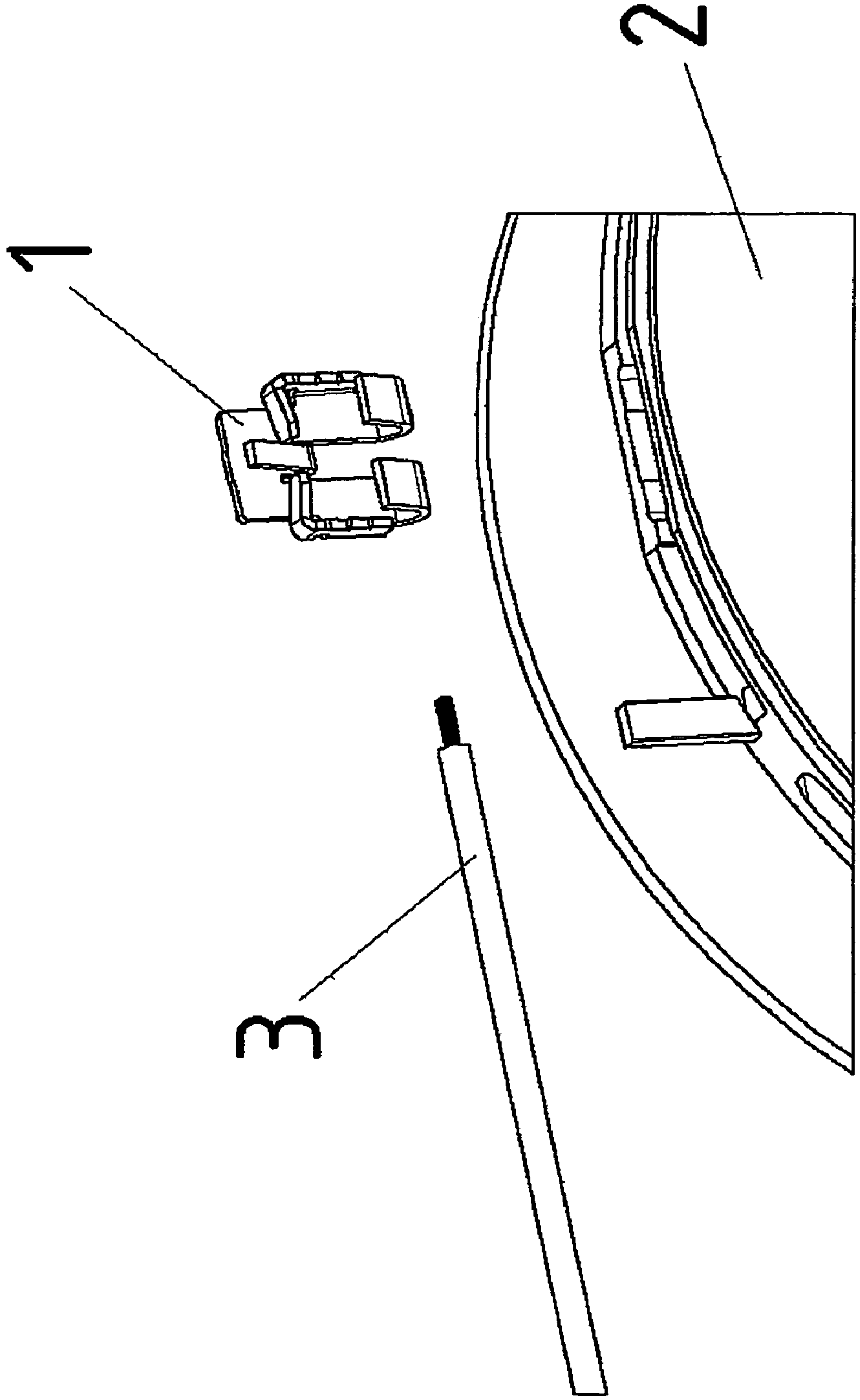

FIG. 3 illustrates a cable 3, including electrically conductive stranded conductor and insulation, which is able to be introduced into the lower part of sleeve 1, before the latter is inserted into the bobbin.

Figure 4:
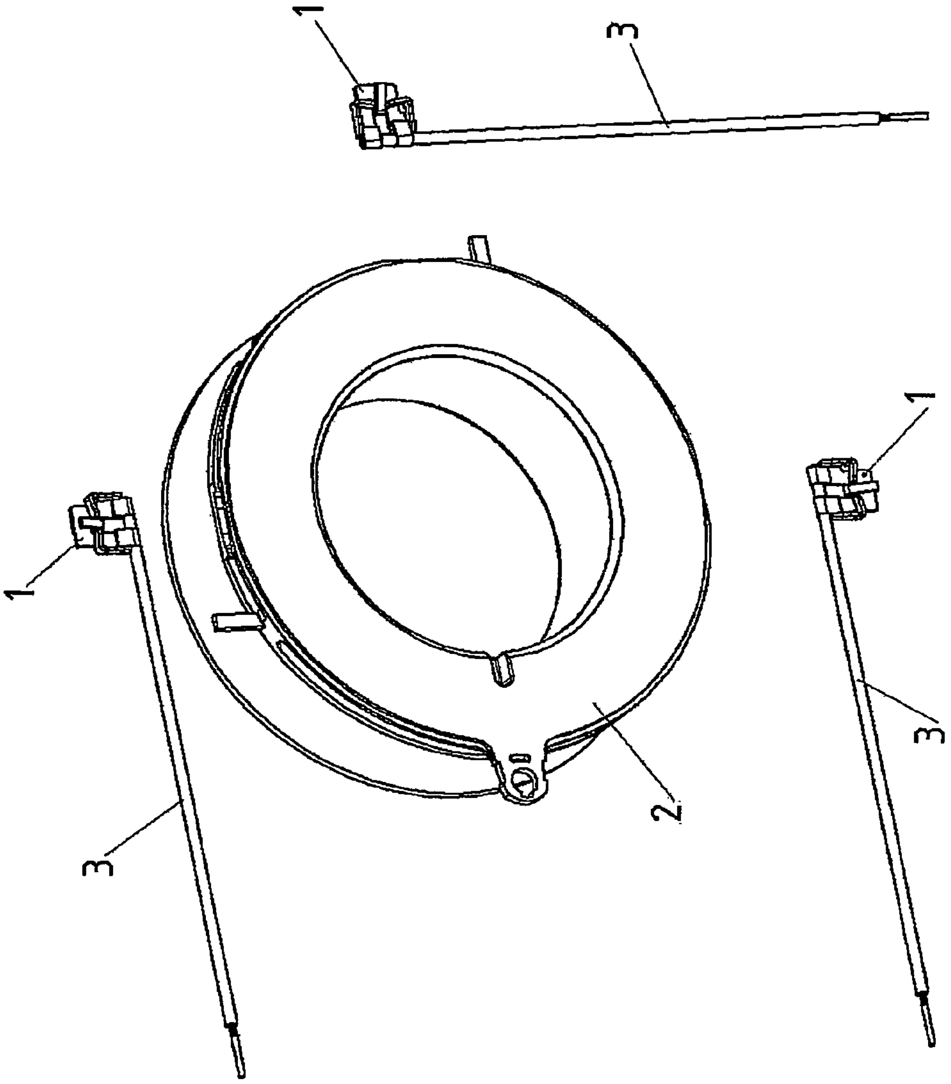

FIG. 4 illustrates three cables 3, which are connected to corresponding sleeves 1 before the latter are introduced into bobbin 1.

Figure 5:
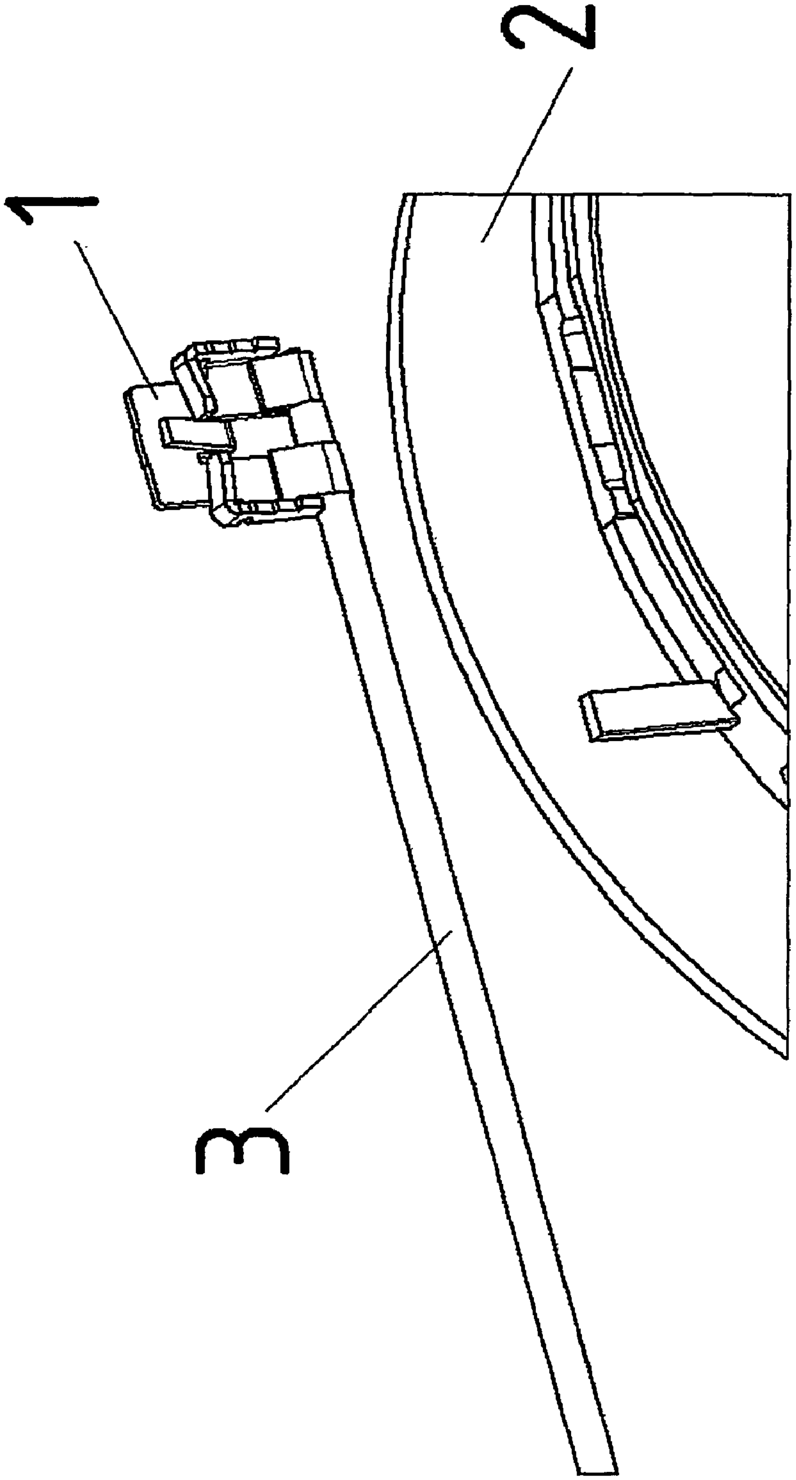

FIG. 5 illustrates cable 3 connected to sleeve 1, FIG. 12 illustrating sleeve 1 by itself, without the cable, in an enlarged version. The left bent part 25 is deformed such that the insulation of sleeve 1 is fixed, and thus a strain relief is provided for the right part of the cable. Right bent part 20 is connected to the stranded conductor of cable 3 in an electrically conductive manner, e.g., in welded form.

Figure 6:
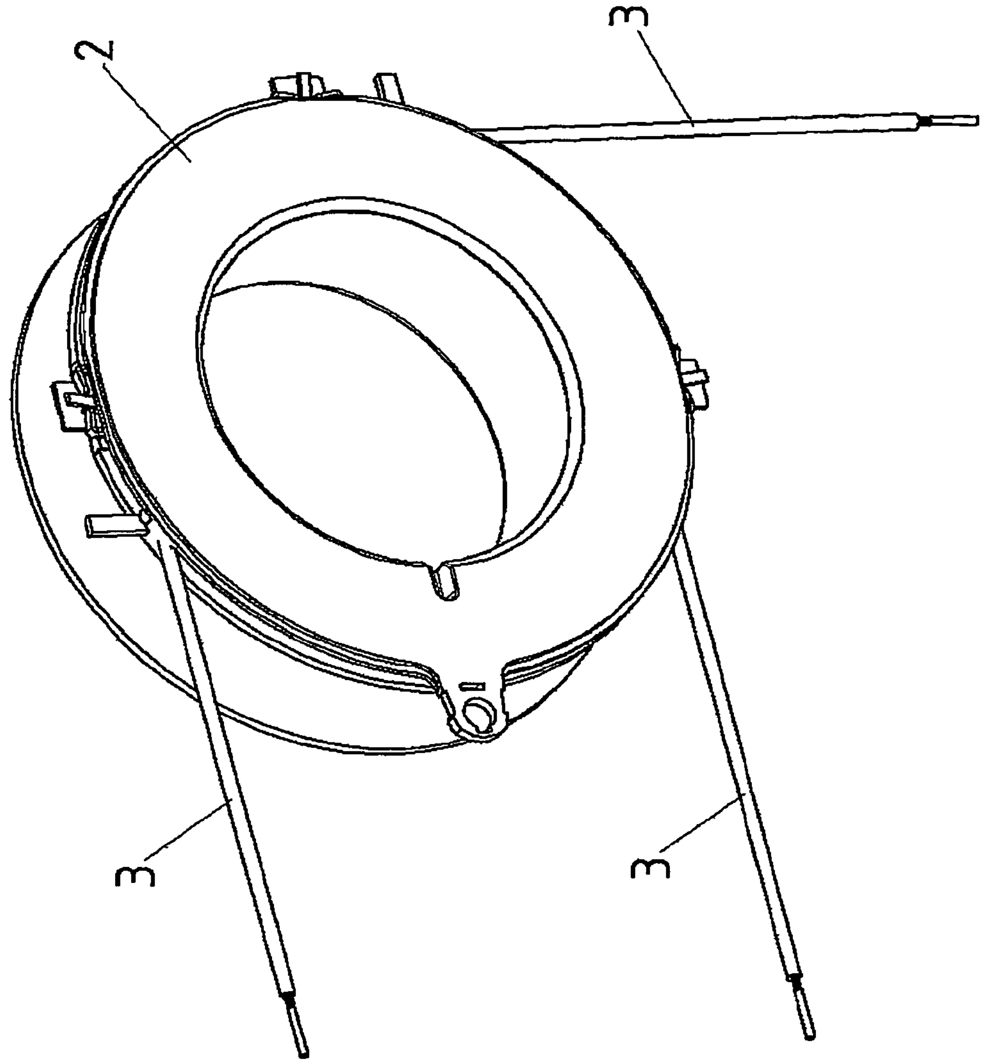

FIG. 6 illustrates bobbin 2, sleeves 1 connected to the cables being introduced.

Figure 7:
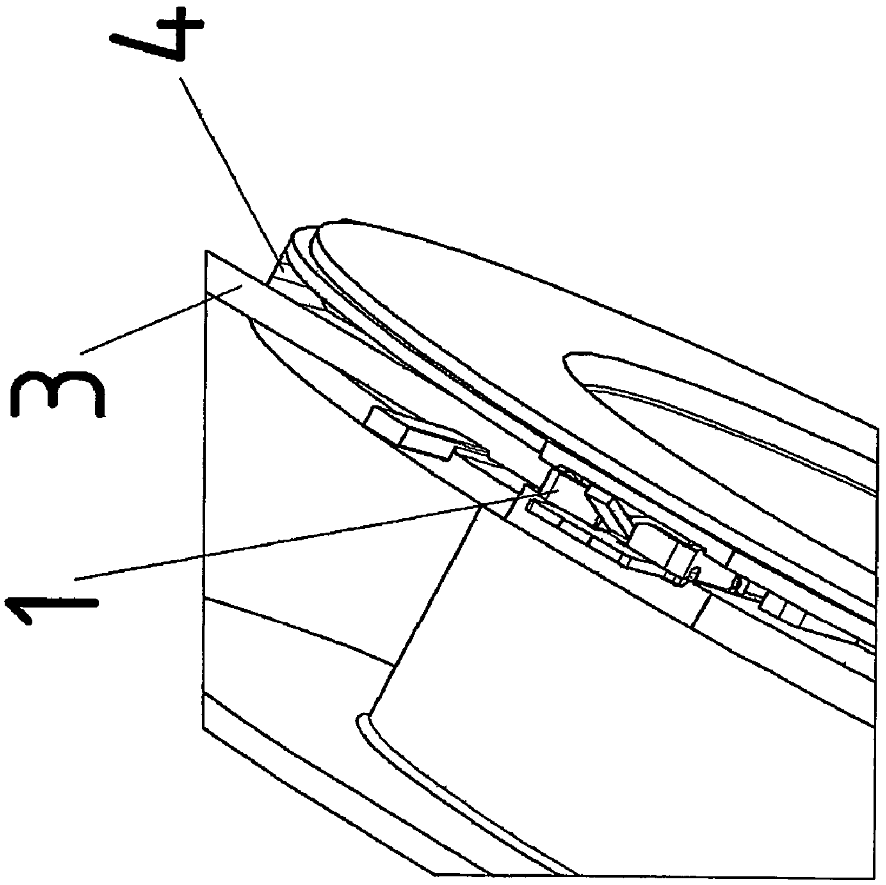

FIG. 7 illustrates channel 4, into which sleeves 1 are pushed in, in a clearer manner. Channel 4 is arranged as a pocket.

Figure 8:
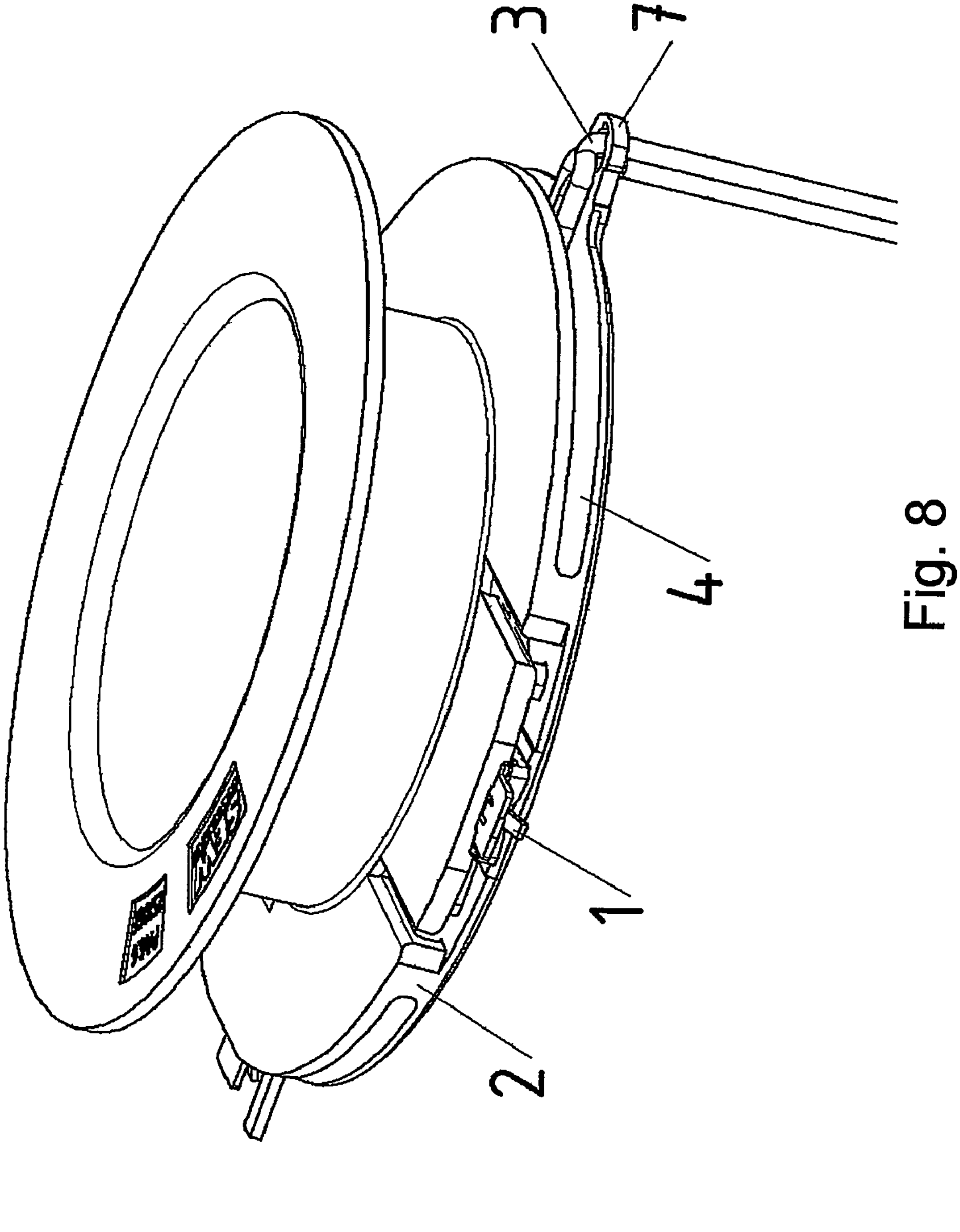

FIG. 8, just as FIG. 7, illustrates the pushed-in sleeves, the cables being guided through the eyelet of holding device 7.

Figure 9:
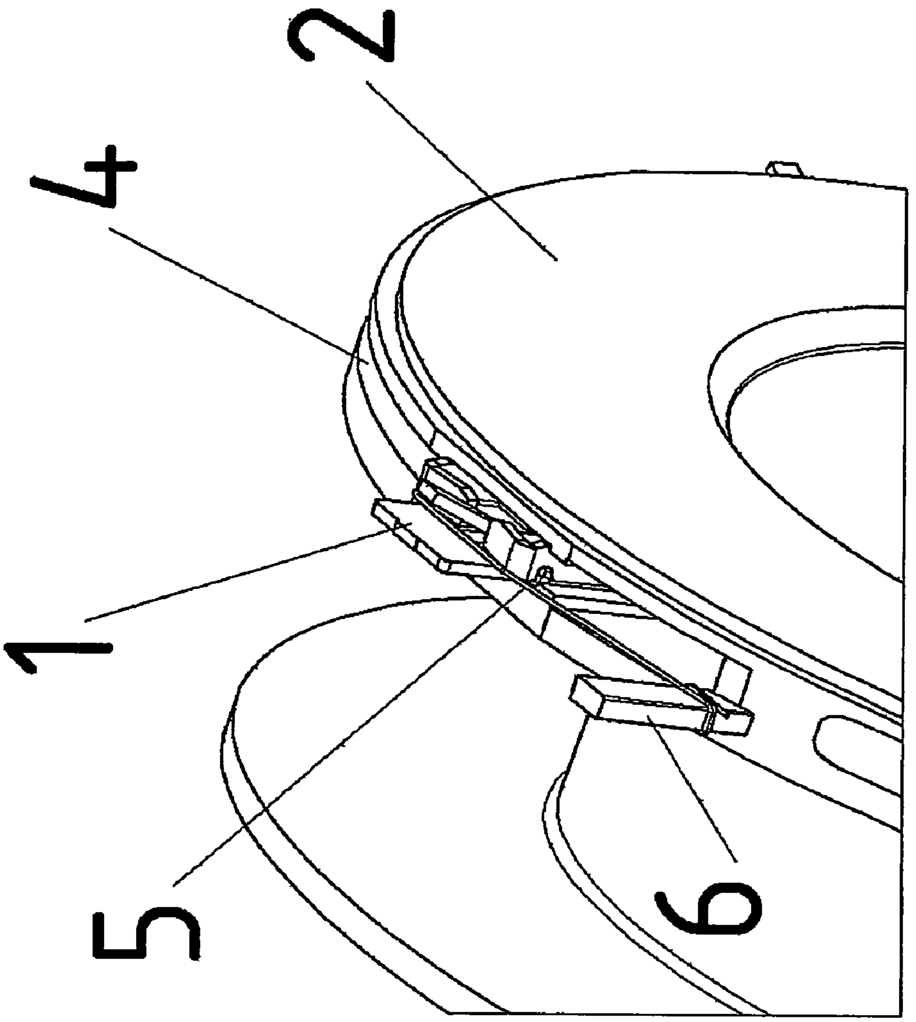

FIG. 9 illustrates a holding device 6 for fixing a first end of a winding wire 5, which is guided over the sleeve and lies on tabs 24 of sleeve 1, FIG. 12 illustrating sleeve 1 enlarged by itself without cable.

Figure 10:
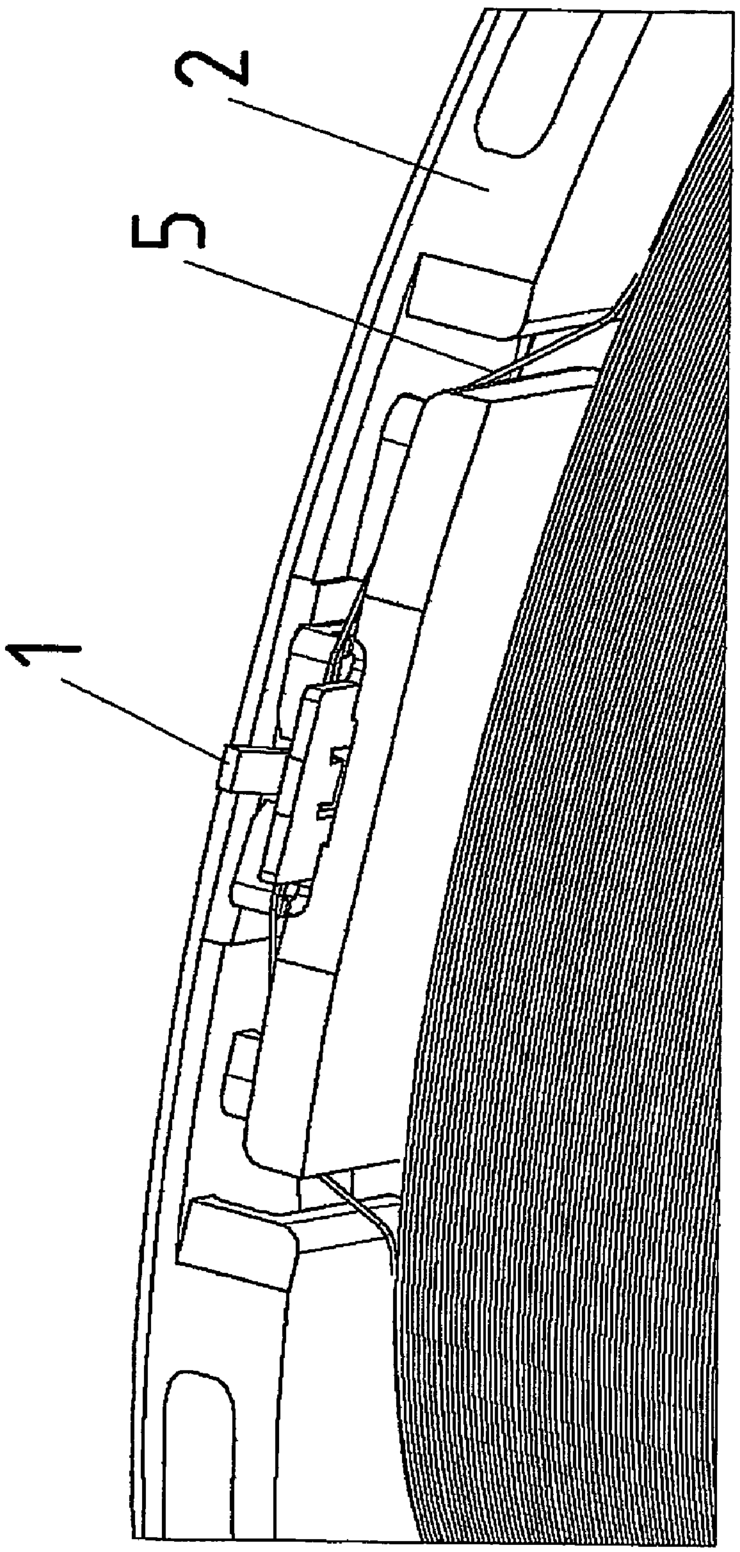

FIG. 10 illustrates a winding wire 5 guided via sleeve 1.

Figure 11:
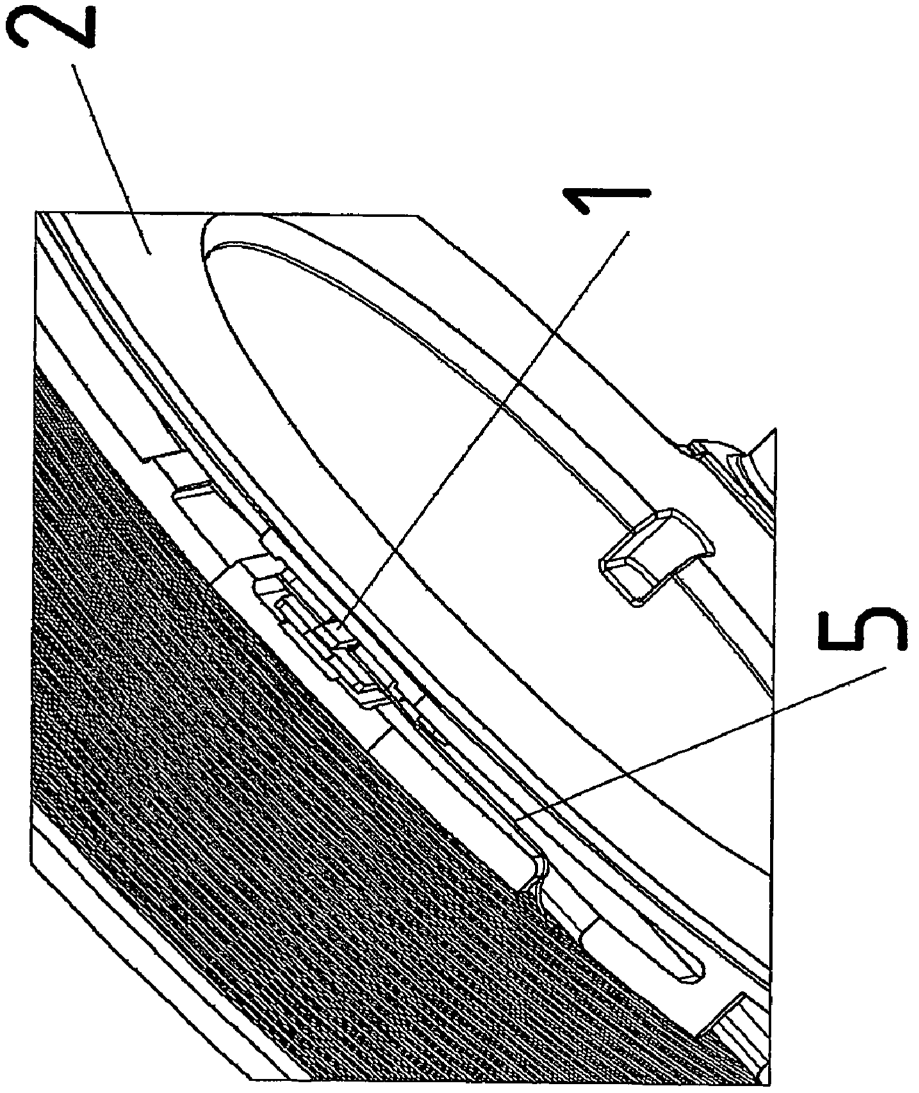

FIG. 11 illustrates sleeve 1 in the state in which it is pushed into the bobbin.

Figure 13A:
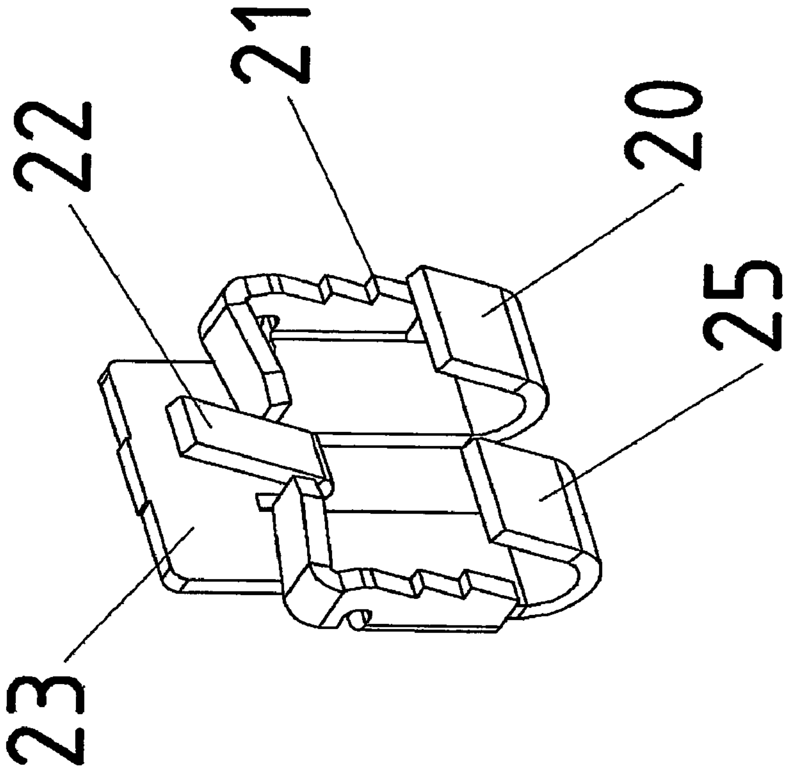

In FIG. 12, the sleeve is illustrated larger than in FIG. 13*a*. The sleeve is arranged as a punched bent component, and has a wall part 23, arranged as a third or fourth region, from which a tab 22 is bent away.

Regions having barbs 21 and additional tabs 24 are arranged to the right and left, and are also bent away. At the lower end of wall part 23, there are arranged as a right tab 20, arranged as a second region, and a left tab 25, arranged as a first region, and again they are bent away.

Figure 13B:
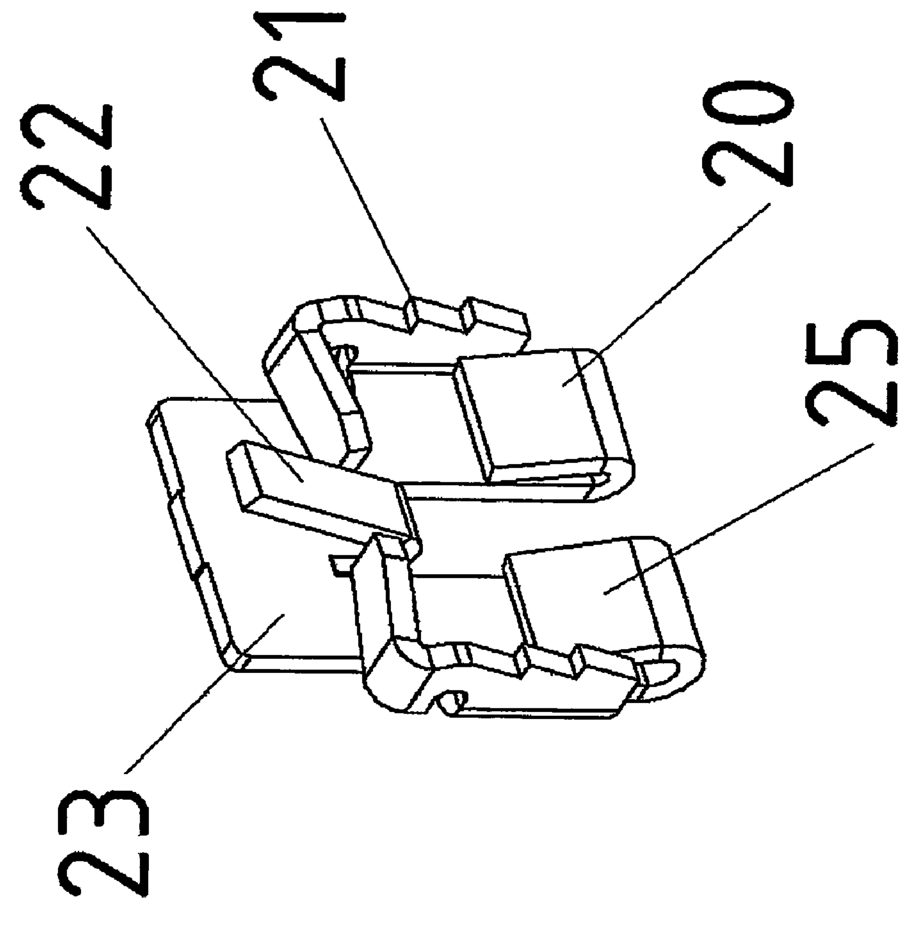

FIG. 13*b* illustrates what the bending state is of tabs 20, 25 when a cable with its insulation is introduced coming from the left, and the insulation is fixed using left tab 25. This fixing has the effect of strain relief for the stripped, right end part of the cable, that is, the bare stranded conductor. This stranded conductor piece is pressed together using tab 20 and is then electrically welded. This consequently creates a very good conductive connection of the stranded conductor to the sleeve, which bears large mechanical stresses because of the strain relief.

Figure 13C:
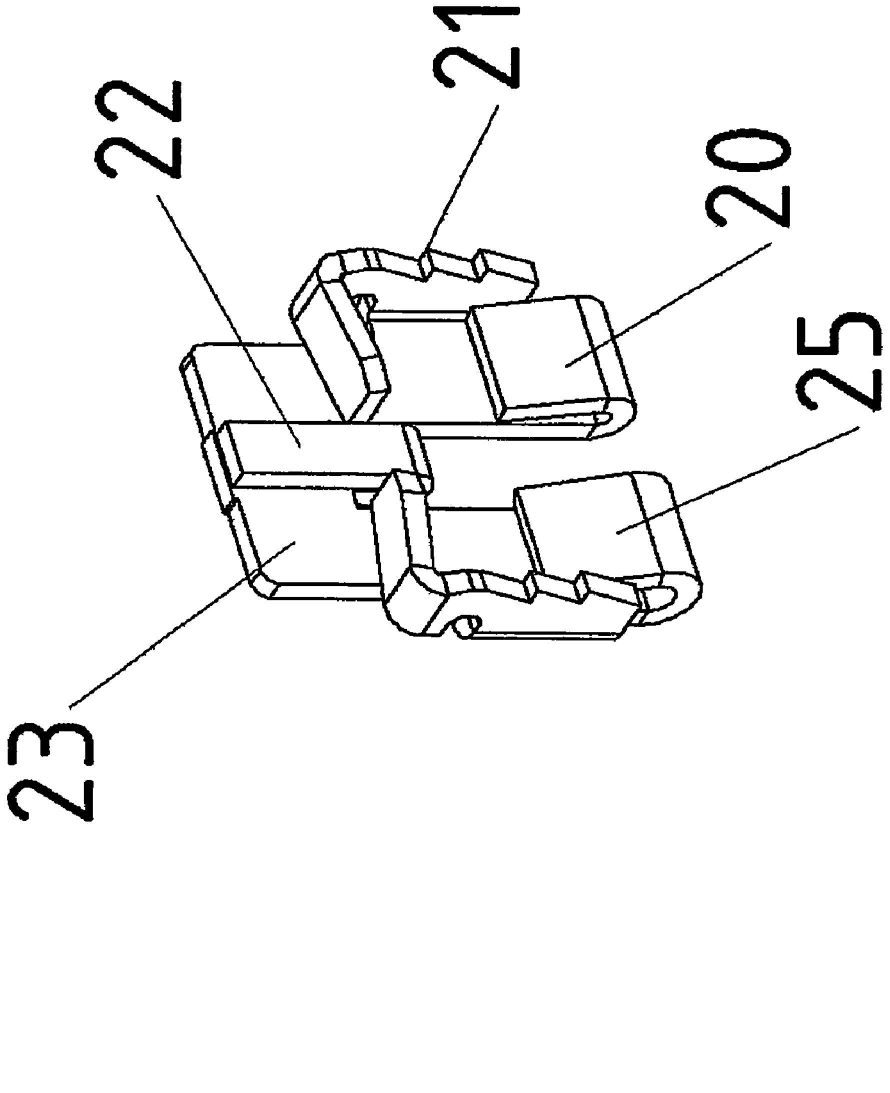

FIG. 13*c* illustrates the bending state of tab 22, which fixes the winding wire and to which the winding wire is welded.

Figure 13D:
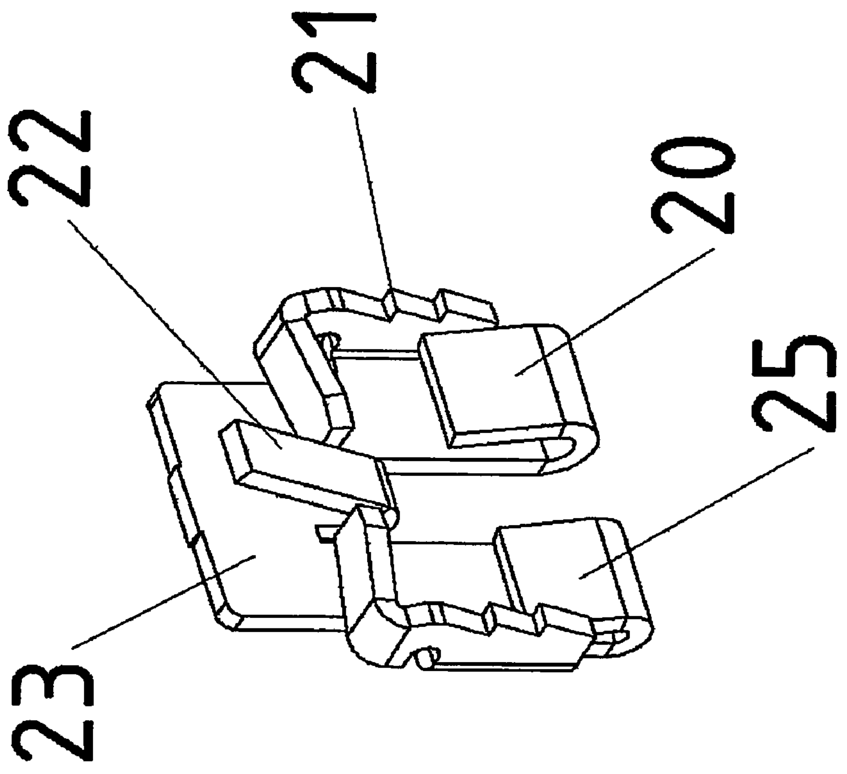

By contrast to FIG. 13*b*, FIG. 13*d* illustrates the cable introduction from the right, tab 20 being consequently less bent for fixing the cable having insulation, and tab 25 being more strongly bent for fixing the stranded conductor of the stripped end piece of the cable.

Figure 14A:
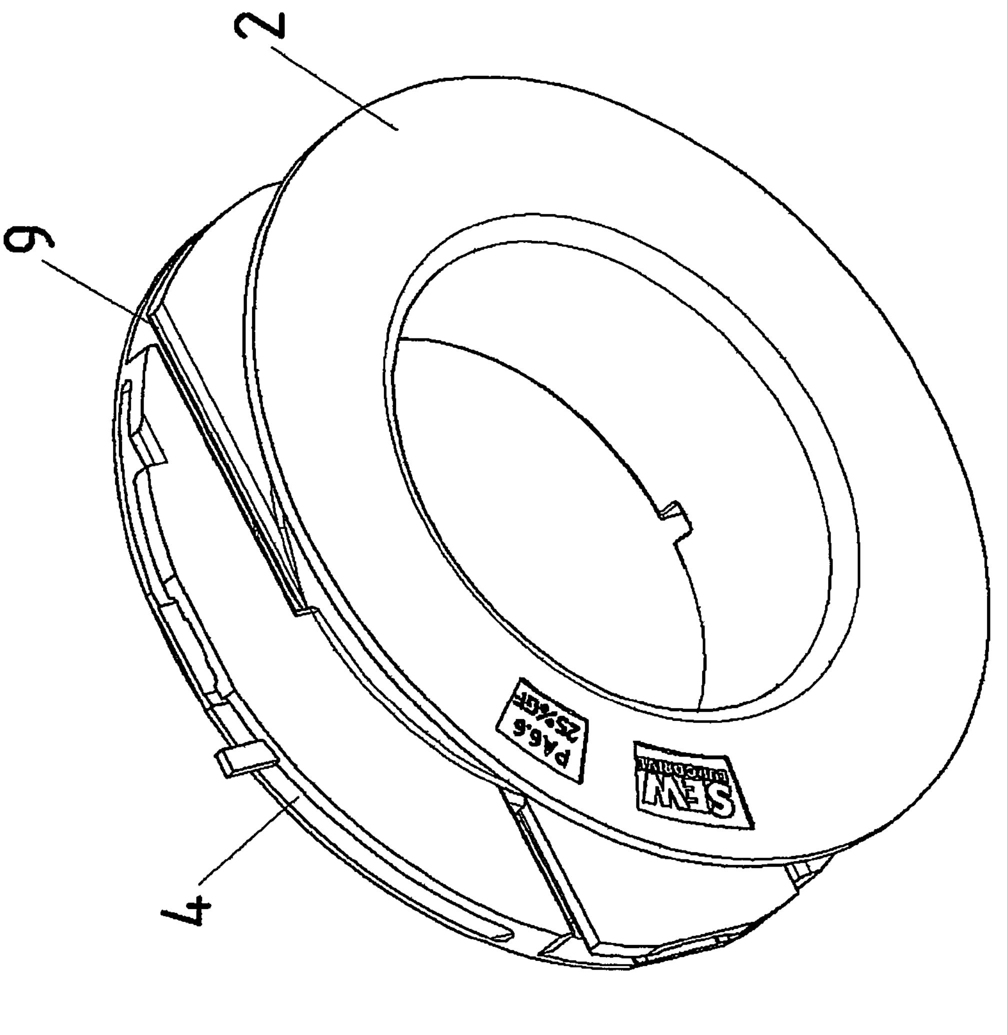
Figure 14B:
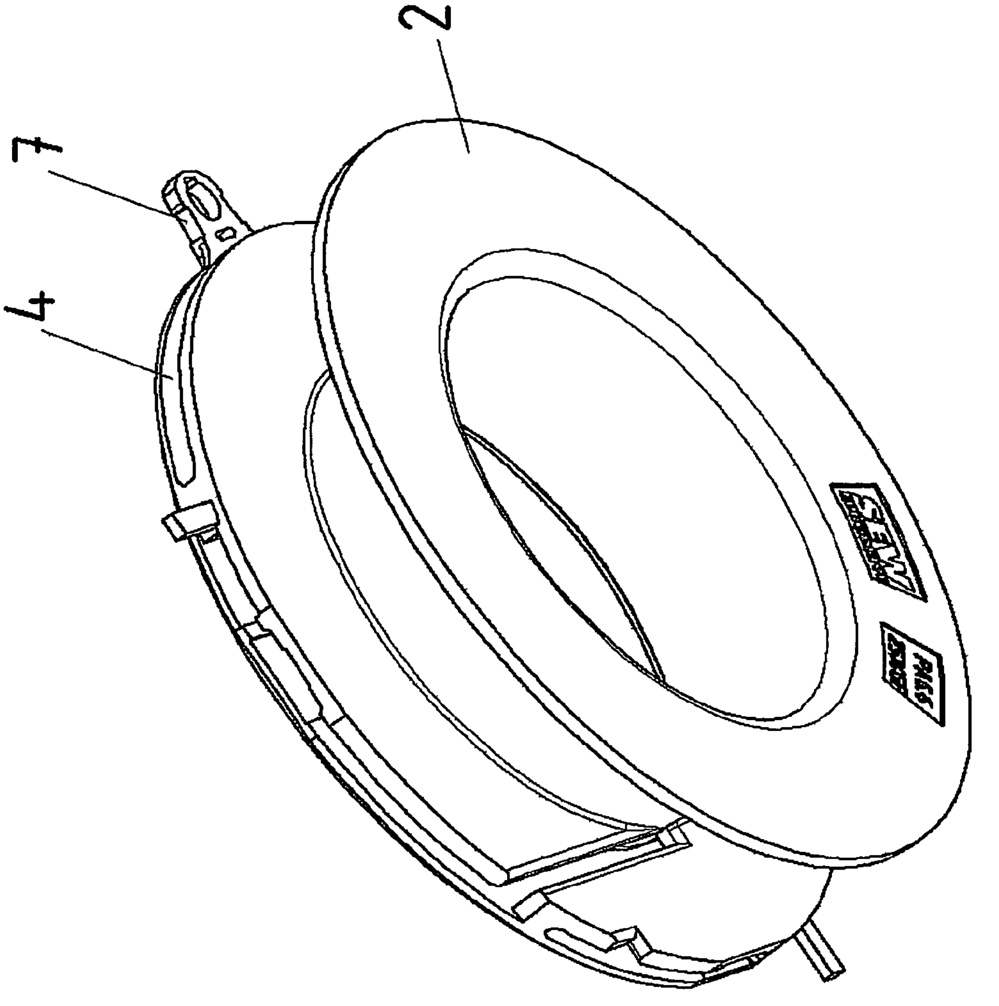

FIGS. 14*a* and 14*b* illustrate bobbin 2 in different orientations, channel 4 arranged as a pocket being illustrated, and slot 9 for the introduction of the winding wire also being illustrated. The winding wire is then wound, and at the end is guided via a corner and sleeve 1 to holding device 6, as is illustrated in FIG. 9.

Holding device 6 may also be omitted on the bobbin and instead be provided on the tool.

The channel may be encapsulated at the end of the manufacturing process using an encapsulating compound. Consequently, one is able to achieve both mechanical and chemical protection for the spool winding.

The spool is able to be provided, e.g., as a brake coil of an electromagnetically operable brake. This brake may be used in, and integrated into an electric motor.

A refinement is illustrated in FIGS. 15 to 27.

Figure 15:
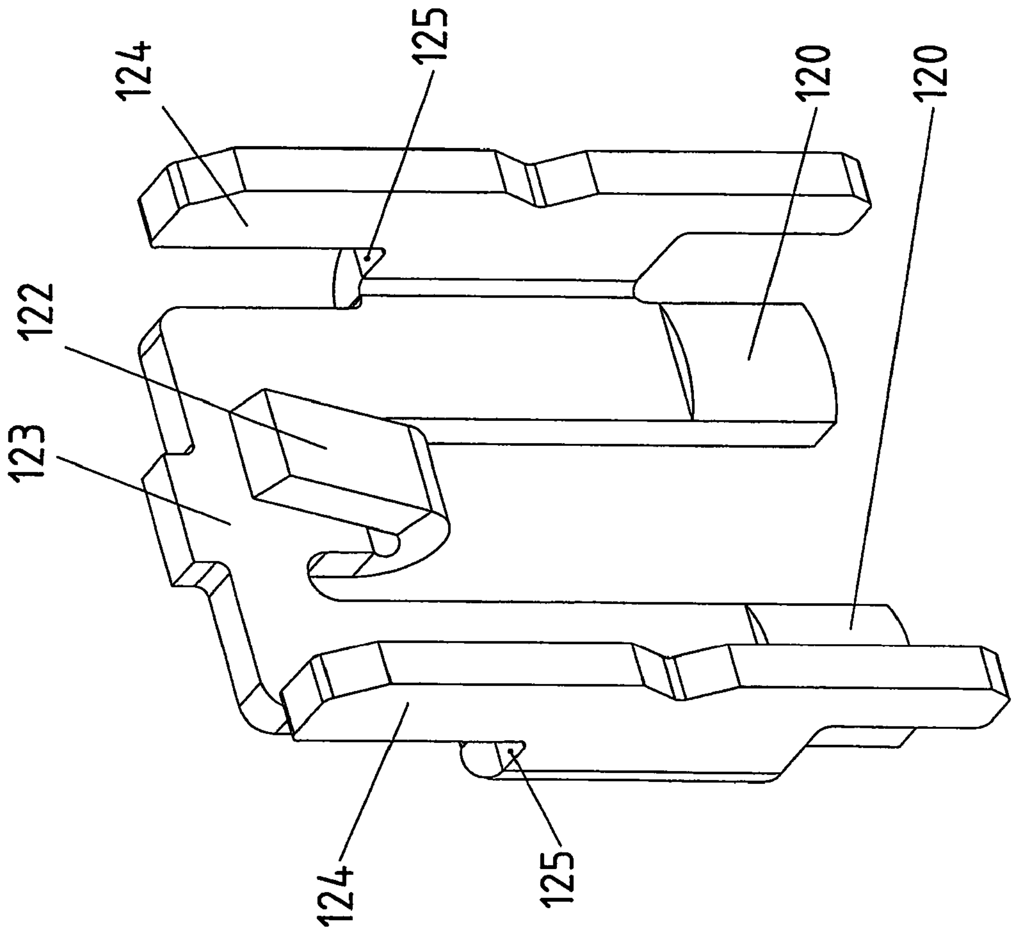
Figure 26:
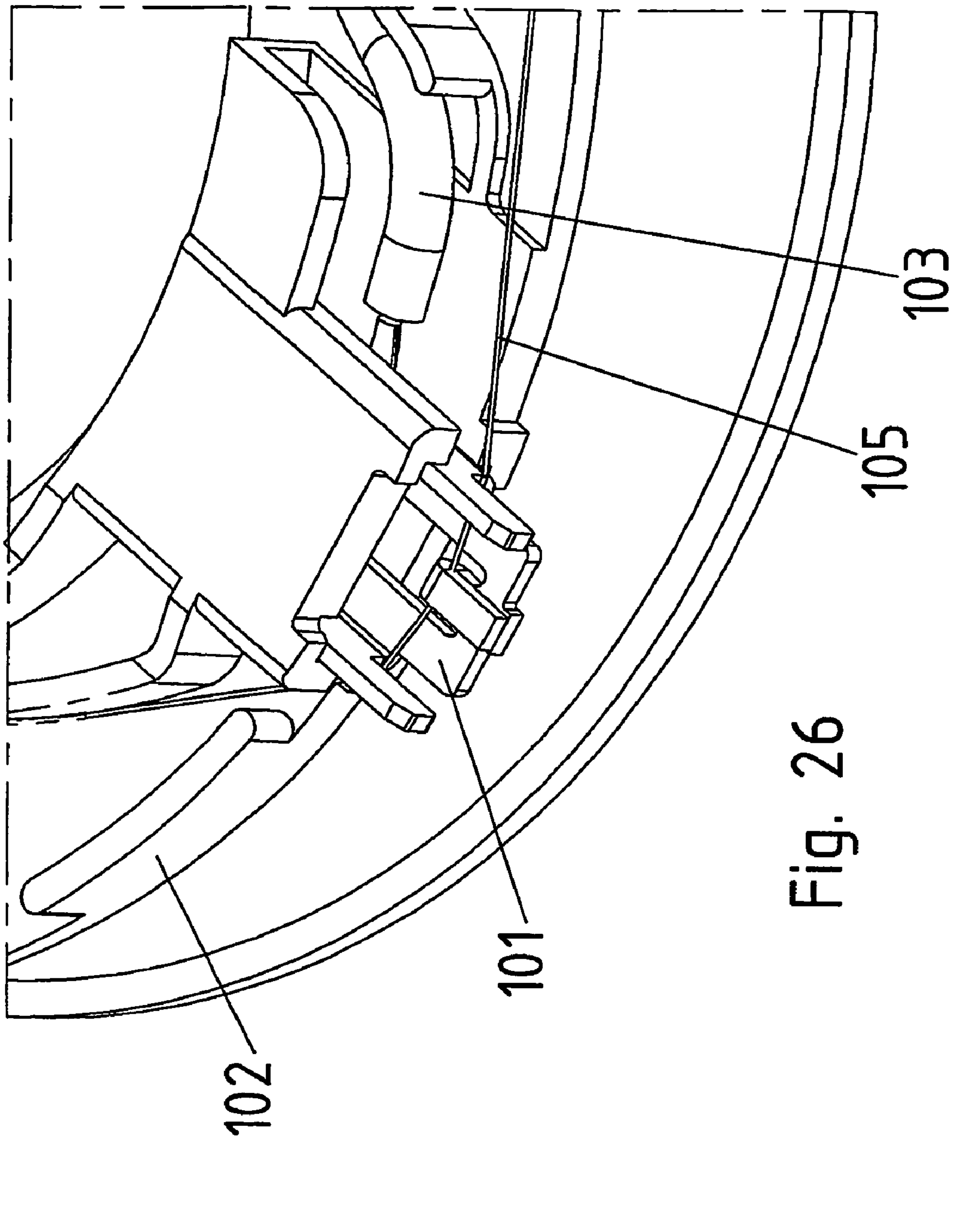
Figure 27:
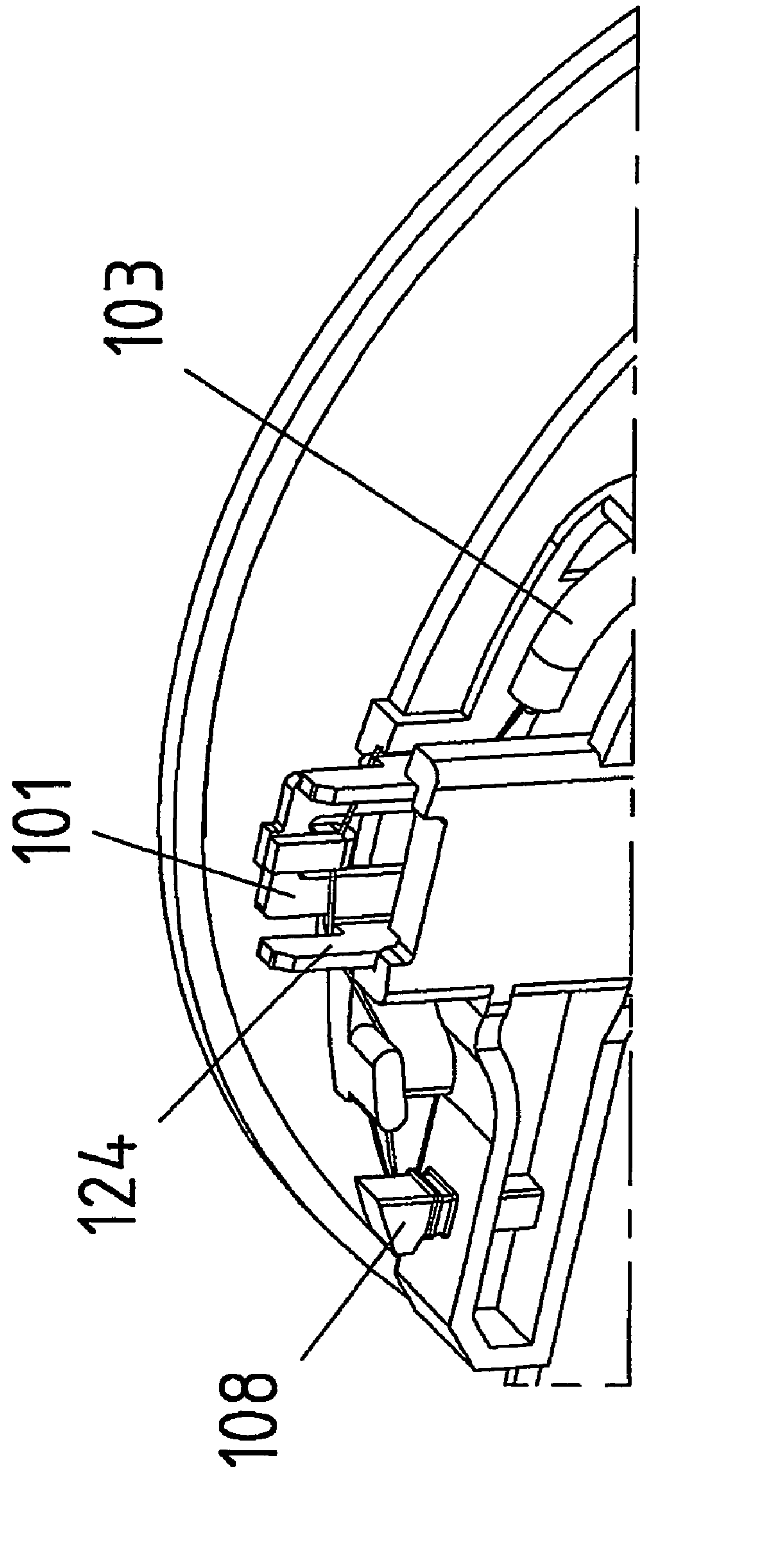

FIG. 15 illustrates sleeve 101 having wall part 123. Tabs 124 have positioning functions for the winding wire. Winding wire 105 is held between wall part 123 and tabs 124. In this context, it lies upon support surfaces 125 for winding wire. In the process, the winding wire is pressed by tab 122 against wall part 123, and is there able to be welded, so as to produce the electrical connection. This running of the wire is illustrated in FIGS. 26 and 27. Wall part areas 120 are provided for connecting to stripped cable 103, including stranded conductor and insulation. The stranded conductor wires are there able to be welded or soldered to a wall part area 120, as is illustrated in more detail in FIG. 18.

Figure 16:
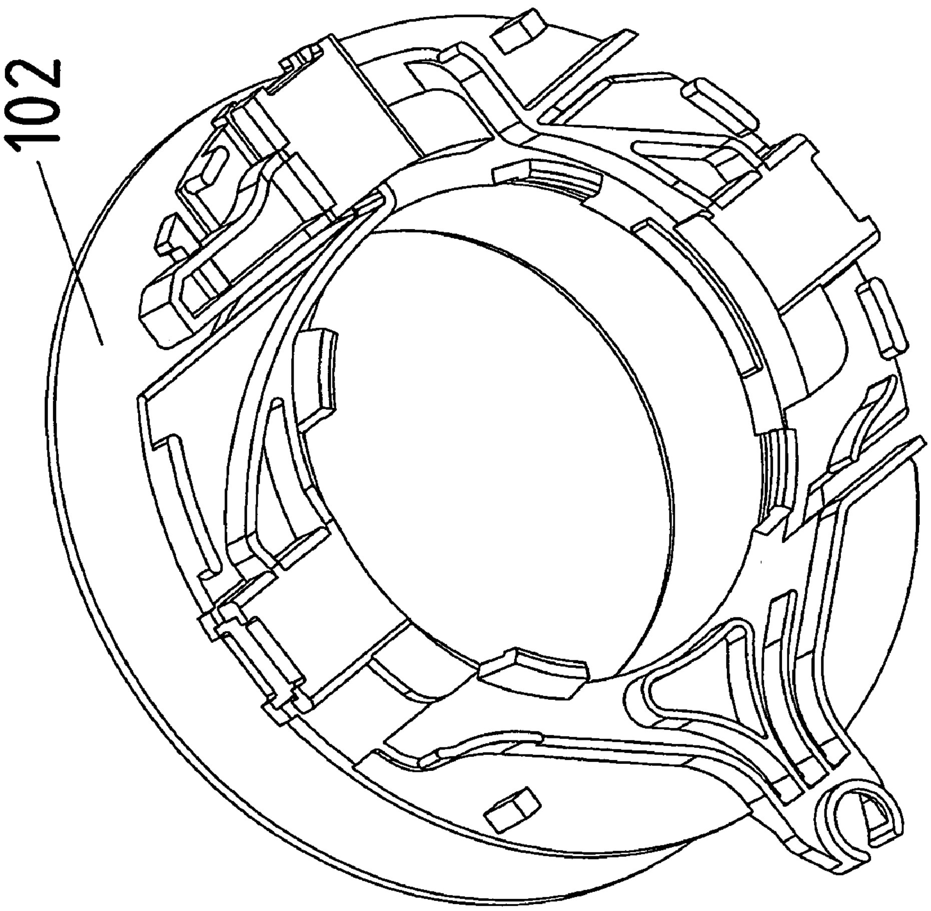

FIG. 16 illustrates bobbin 102, into which up to three sleeves 101 are able to be introduced.

Figure 17:
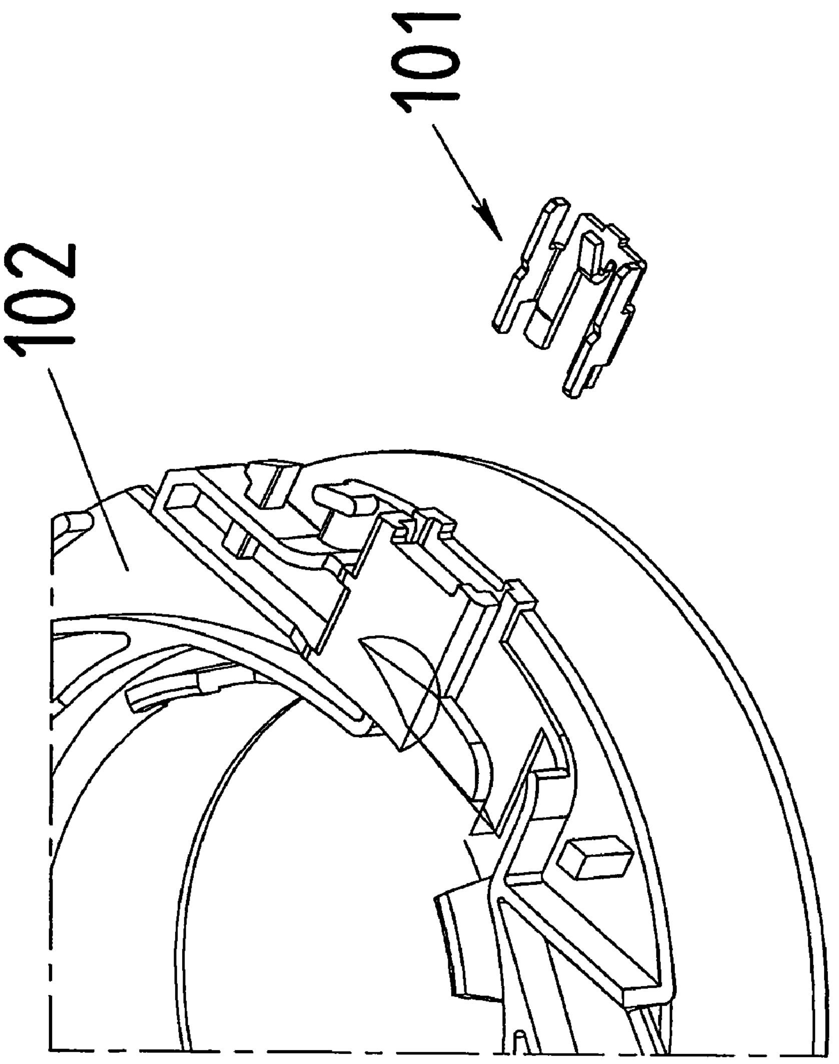
Figure 18:
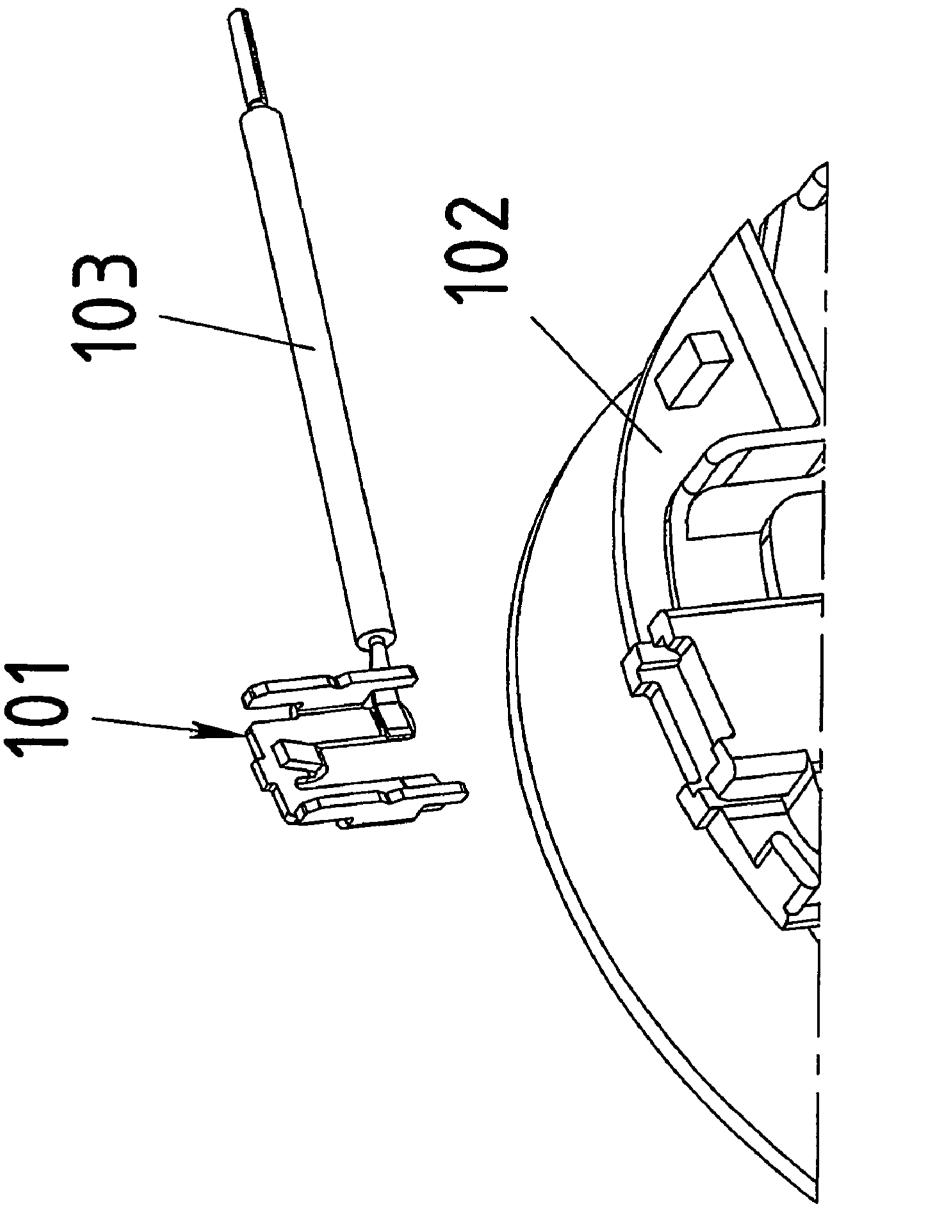

FIG. 17 illustrates sleeve 101 before it is pushed into bobbin 102. FIG. 18 illustrates the connection to a cable 103 having insulation, the stripped end regions of cable 103, being welded.

Figure 19:
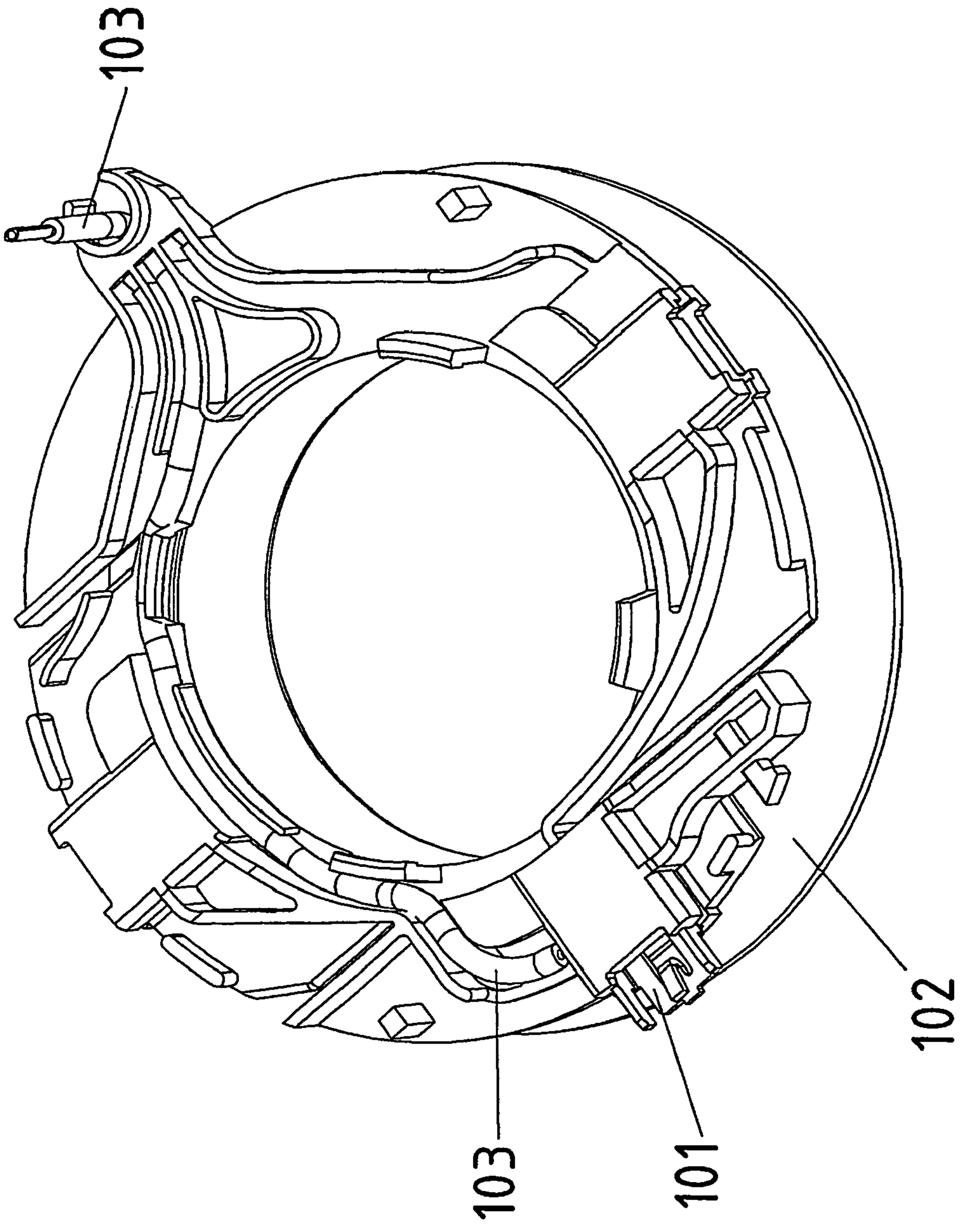
Figure 20:
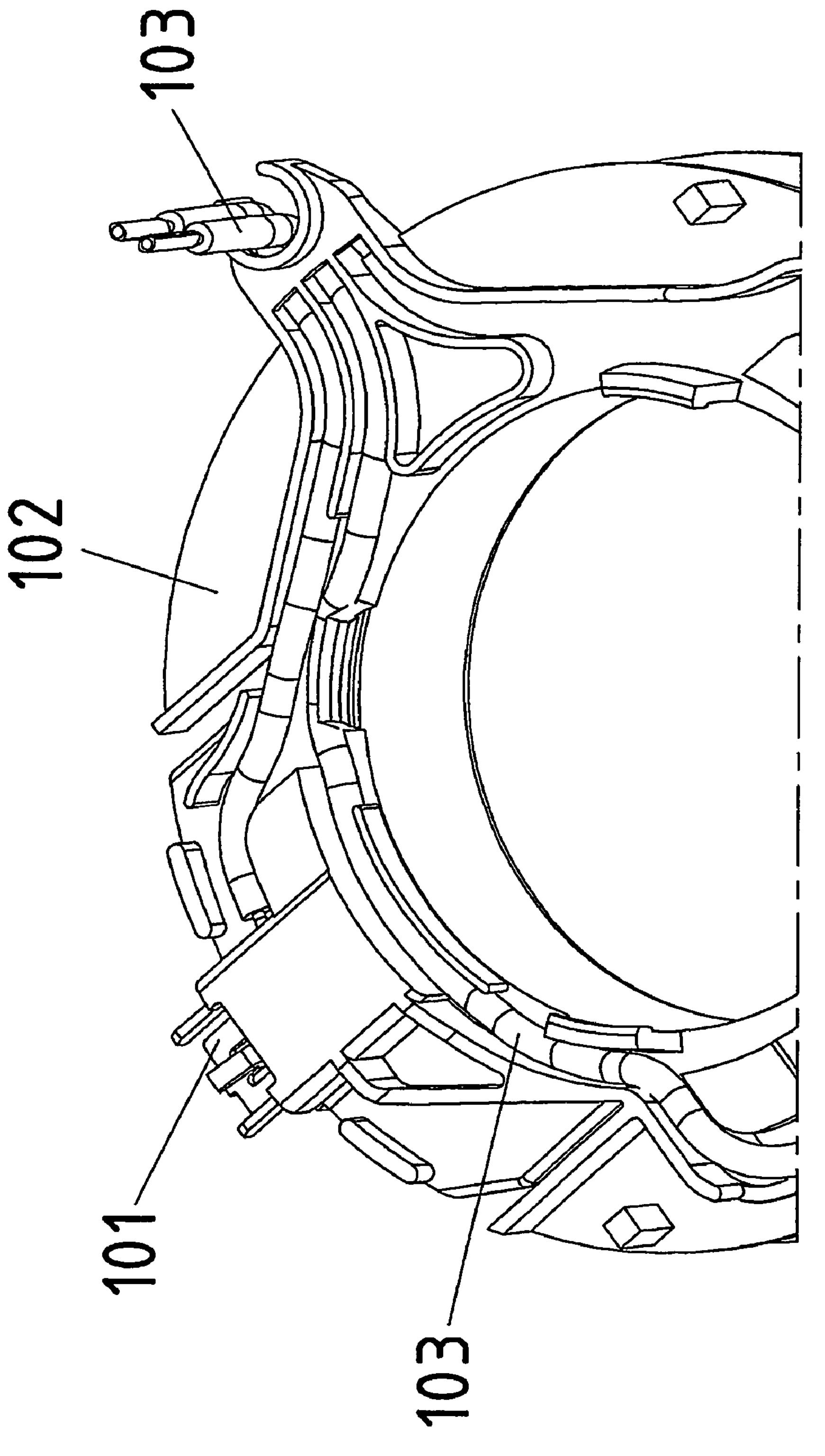
Figure 21:
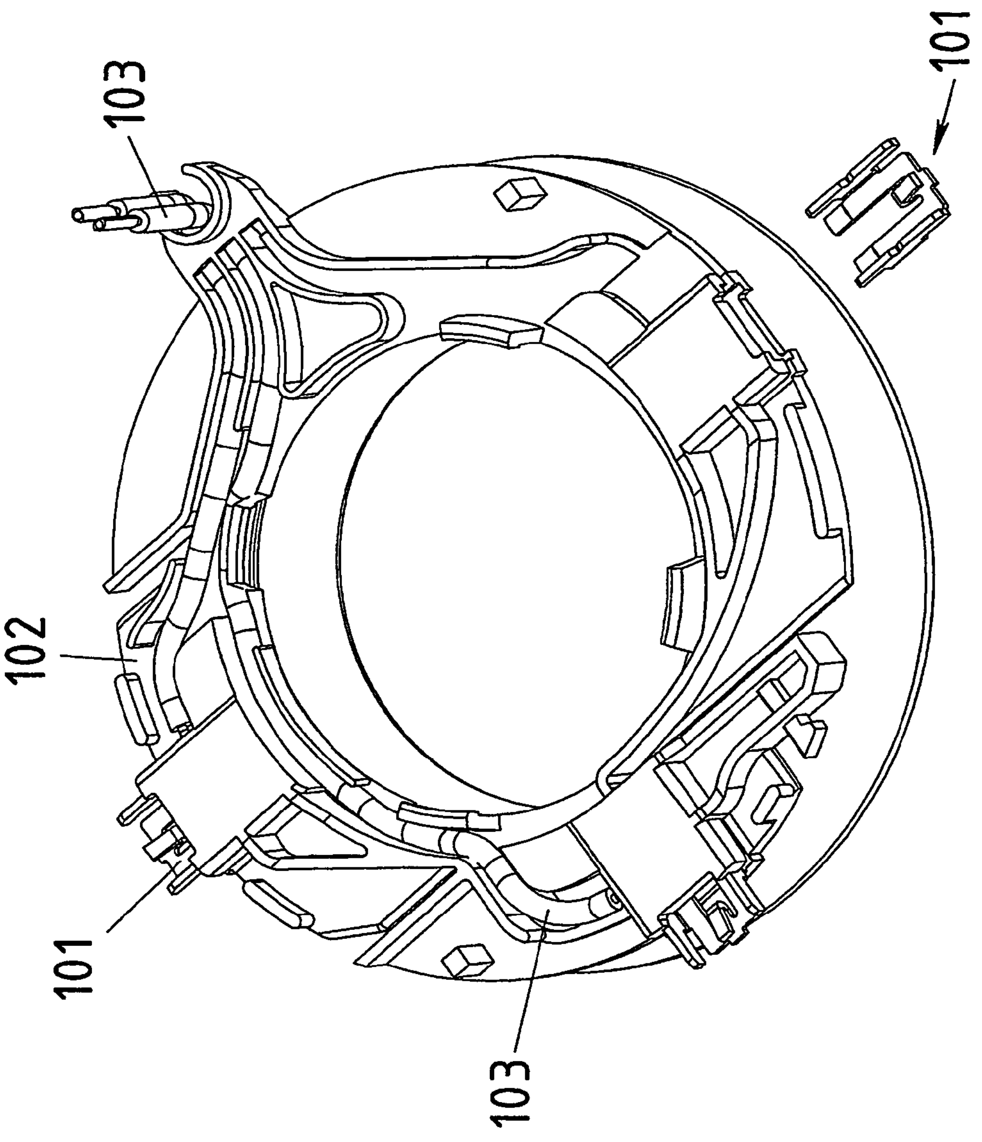

FIG. 19 illustrates sleeve 101 pushed into bobbin 102, and cable 103 laid into a channel. FIG. 20 illustrates an associated different perspective. FIG. 21 illustrates the bobbin having two sleeves 101 pushed in and one sleeve 101 before being pushed in.

Figure 22:
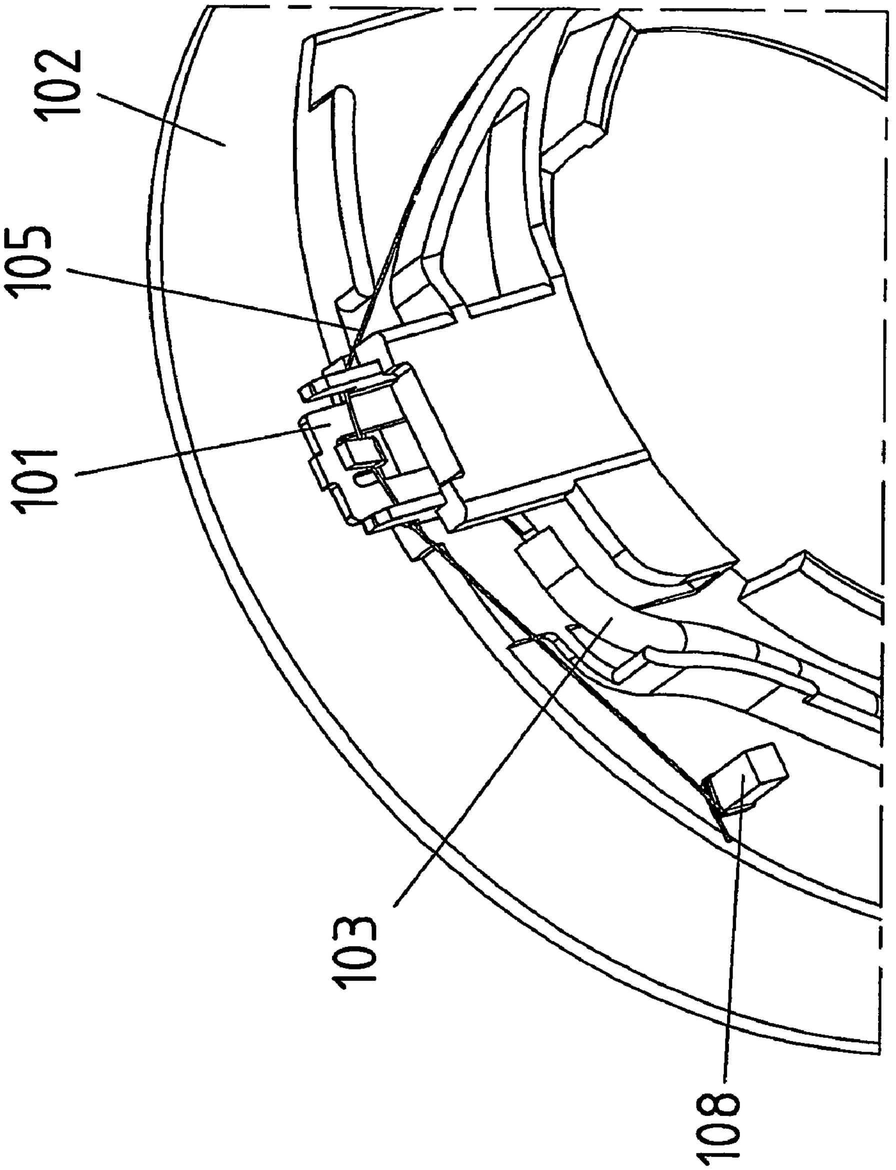
Figure 23:
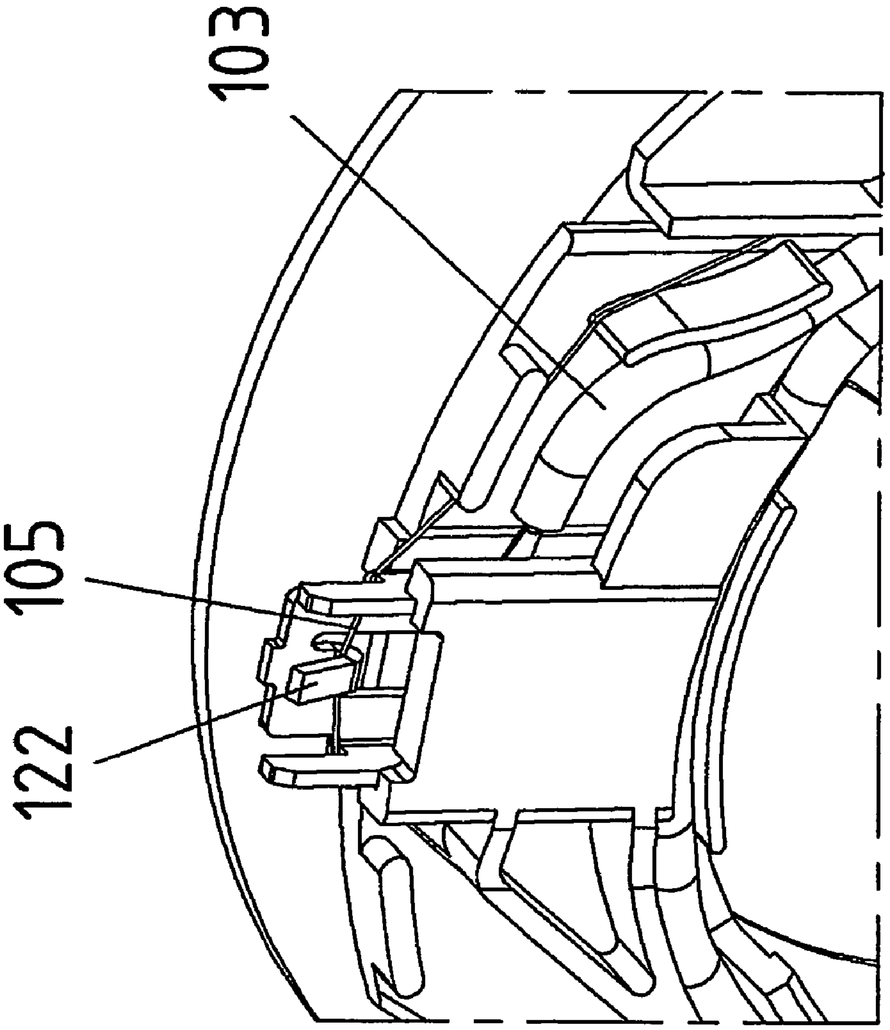
Figure 24:
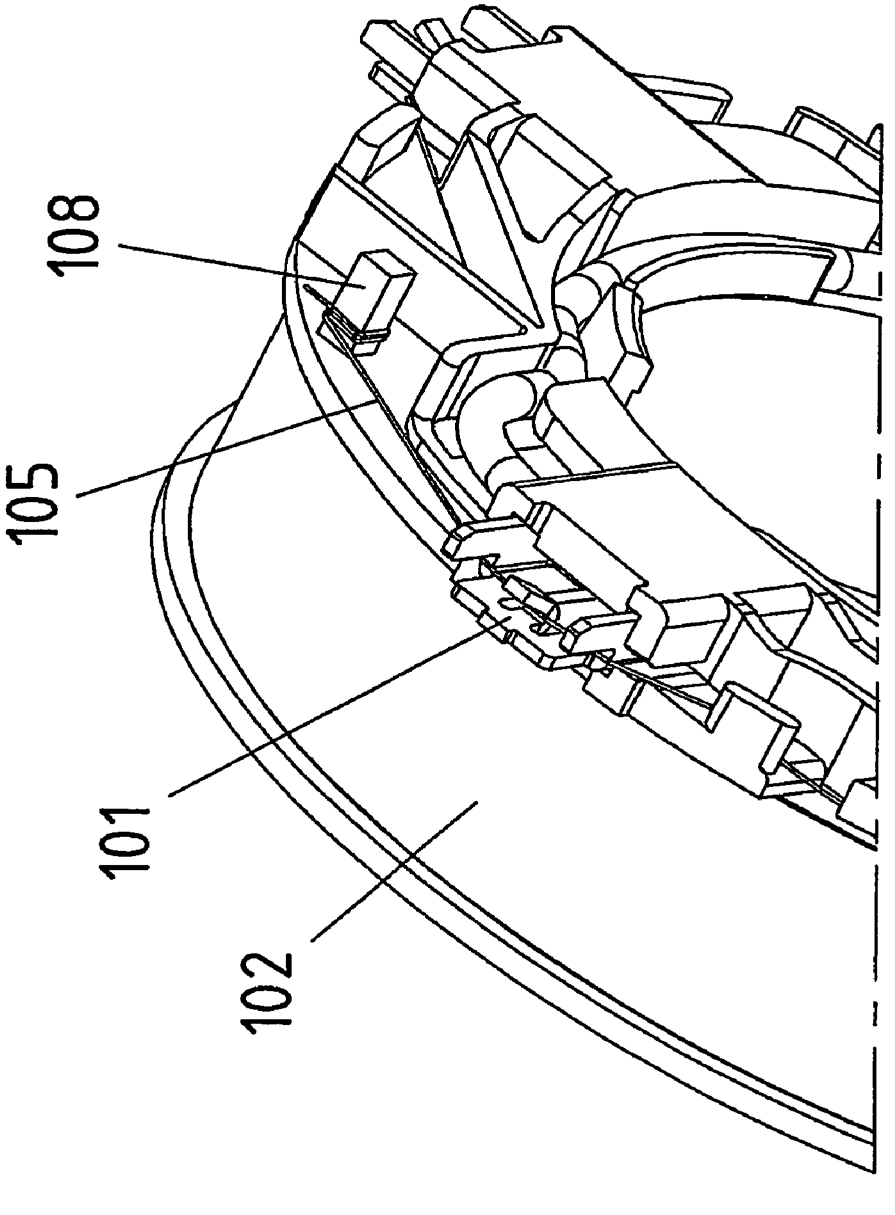

FIG. 22 illustrates winding wire 105, which is fastened to a holding device 108, and which extends over support surfaces 125 of the sleeve. Winding wire 105 is laid in, in between, into still open tab 122. FIGS. 23 and 24 each illustrate another view.

Figure 25:
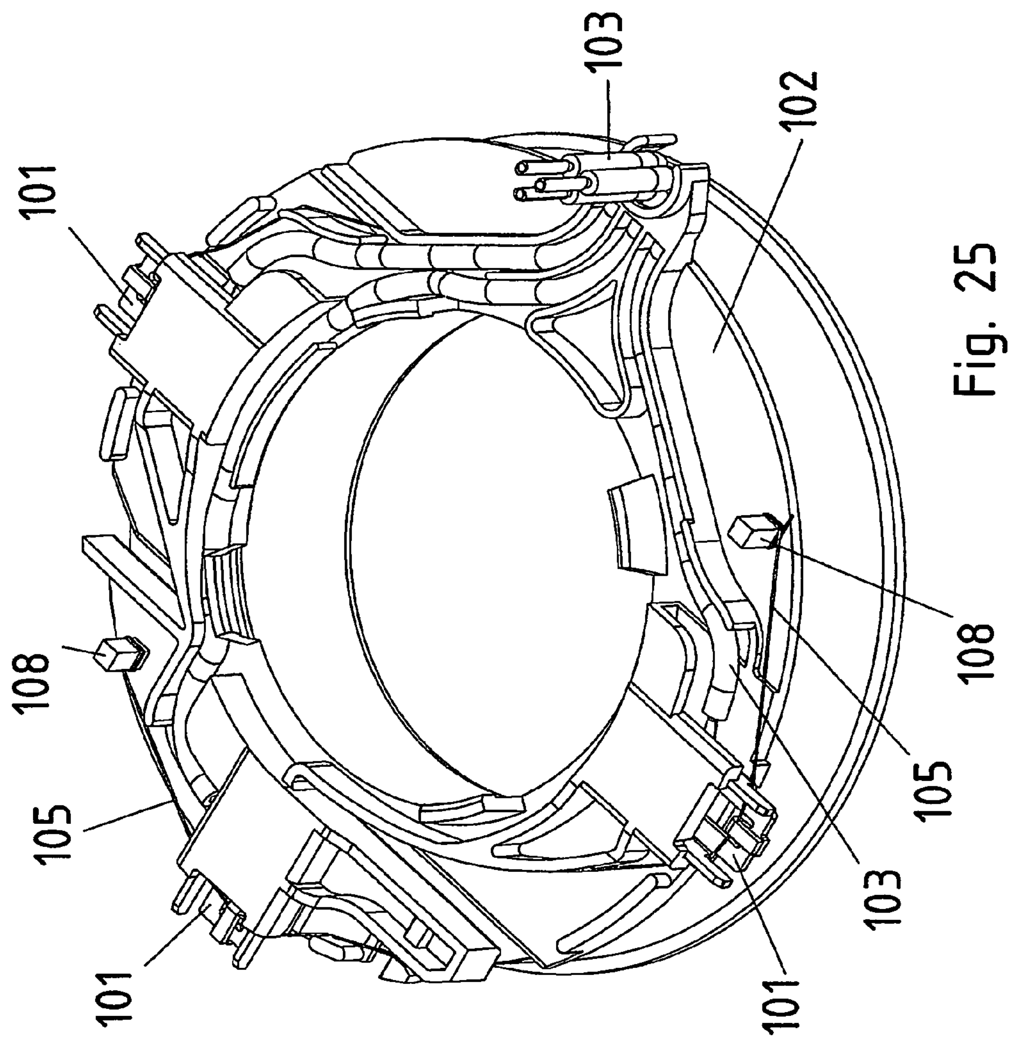

FIG. 25 illustrates bobbin 102 having three sleeves 101 pushed in, tab 122 being pressed closed, that is, against wall part 123. In this manner, the winding wire may be easily welded. FIG. 26 illustrates an enlarged section of this. FIG. 27 illustrates another perspective.

What is claimed is:

1. A spool, comprising:

at least one bobbin, having at least one circumferential channel;

a winding wire; and at least one sleeve electrically connected to the winding wire, the sleeve electrically connected to at least one of (a) an electrical line and (b) a stranded conductor of a cable, the sleeve including at least one deformable region, the deformable region deformable to provide a force-locking connection and weldability for producing the electrical connections, the sleeve including at least one first support region arranged for at least one of (a) support and (b) guidance for the winding wire, the sleeve including at least one second region, arranged as a tab, deformable for force-locking connection to the winding wire and providable for producing a welded joint to the winding wire, the sleeve including at least one third region for a welded joint to at least one of (a) the electrical line and (b) the stranded conductor of the cable, wherein the at least one circumferential channel is configured to accept the at least one sleeve, and the at least one sleeve is fastened to the bobbin in the channel by at least one of (a) force-locking and (b) form-locking.

2. The spool according to claim 1, wherein the third region includes a wall part region.

3. The spool according to claim 1, wherein the winding wire is lacquered for electrical insulation.

4. The spool according to claim 3, wherein lacquering of the winding wire is removable when producing a welded joint at least in a vicinity of an electrical contact area due to heating that occurs during production of the welded joint.

5. The spool according to claim 1, wherein the channel is arranged as a pocket.

6. The spool according to claim 1, wherein the sleeve includes a metallic punched bent component.

7. The spool according to claim 1, wherein the sleeve includes at least one barb.

8. The spool according to claim 1, wherein the sleeve includes at least one barb adapted to hook into the channel.

9. The spool according to claim 1, wherein the first region includes a tab.

10. The spool according to claim 1, wherein the second region includes a tab.

11. The spool according to claim 1, wherein the spool includes a center tap.

12. The spool according to claim 1, wherein the spool includes an encapsulating material.

13. The spool according to claim 1, wherein the spool includes an encapsulating material in an area of at least one of (a) the channel and (b) the winding wire.

14. The spool according to claim 1, wherein the bobbin includes a holding device for at least one of (a) the winding wire and (b) a cable.

15. A spool, comprising:

at least one bobbin, including at least one circumferential channel;

a winding wire;

at least one sleeve is electrically connected to the winding wire, the sleeve electrically connected to an electrical line, the sleeve including at least one deformable region, to produce the electrical connection, a respectively deformable region is deformable to provide a force-locking connection and weldability;

wherein the at least one circumferential channel is configured to accept a tab of the at least one sleeve for connecting the electrical line to the sleeve, and the at least one sleeve is fastened to the bobbin in the channel by at least one of (a) force-locking and (b) form-locking, wherein the electrical line is connected to the sleeve between the tab of the at least one sleeve and a wall part area of the at least one sleeve.

16. The spool according to claim 15, wherein the electrical line includes a stranded conductor of a cable.

17. The spool according to claim 16, wherein the sleeve is arranged to provide an electrical connection between the winding wire and the at least one of (a) the electrical line and (b) the stranded conductor.

18. The spool according to claim 15, wherein the tab extends in a plane substantially normal to an axis of the bobbin even after the electrical line is connected to the sleeve.

19. A spool, comprising:

at least one bobbin, including at least one circumferential channel;

a winding wire;

at least one sleeve is electrically connected to the winding wire, the sleeve electrically connected to an electrical line, the sleeve including at least one deformable region, to produce the electrical connection, a respectively deformable region is deformable to provide a force-locking connection and weldability;

wherein the at least one circumferential channel is configured to accept the at least one sleeve, and the at least one sleeve is fastened to the bobbin in the channel by at least one of (a) force-locking and (b) form-locking, the sleeve including at least one first region provided to at least one of (a) support and (b) guide the winding wire, the sleeve including at least one second region deformable for a force-locking connection to the winding wire and is adapted to provide a welded joint to the winding wire;

wherein the sleeve includes at least one third region deformable for a force-locking connection to a stranded connector and is adapted to provide a welded joint to the stranded connector.

20. The spool according to claim 19, wherein the third region includes a tab.

21. The spool according to claim 19, wherein the sleeve includes at least one fourth region deformable for a force-locking connection to a cable and is adapted to provide a welded joint to the stranded connector.

22. The spool according to claim 21, wherein the fourth region includes a tab.

23. The spool according to claim 21, wherein the fourth region is deformable for a force-locking connection to insulation of the cable.

24. The spool according to claim 21, wherein the regions are connected at a wall part.

25. A brake, comprising:

a brake coil in an electromagnet, the brake coil including a spool including:

at least one bobbin, having at least one circumferential channel;

a winding wire; and at least one sleeve electrically connected to the winding wire, the sleeve electrically connected to at least one of (a) an electrical line and (b) a stranded conductor of a cable, the sleeve including at least one deformable region, the deformable region deformable to provide a force-locking connection and weldability for producing the electrical connections, the sleeve including at least one first support region arranged for at least one of (a) support and (b) guidance for the winding wire, the sleeve including at least one second region, arranged as a tab, deformable for force-locking connection to the winding wire and providable for producing a welded joint to the winding wire, the sleeve including at least one third region for a welded joint to at least one of (a) the electrical line and (b) the stranded conductor of the cable;

wherein the at least one circumferential channel is configured to accept the at least one sleeve, and the at least one sleeve is fastened to the bobbin in the channel by at least one of (a) force-locking and (b) form-locking.

26. A brake, comprising:

a brake coil in an electromagnet, the brake coil including a spool including:

at least one bobbin including at least one circumferential channel;

a winding wire;

at least one sleeve is electrically connected to the winding wire, the sleeve electrically connected to an electrical line, the sleeve including at least one deformable region, to produce the electrical connection, a respectively deformable region is deformable to provide a force-locking connection and weldability;

wherein the at least one circumferential channel is configured to accept a tab of the at least one sleeve for connecting the electrical line to the sleeve, and the at least one sleeve is fastened to the bobbin in the channel by at least one of (a) force-locking and (b) form-locking, wherein the electrical line is connected to the sleeve between the tab of the at least one sleeve and a wall part area of the at least one sleeve.

27. The spool according to claim 26, wherein the sleeve includes at least one first region provided to at least one of (a) support and (b) guide the winding wire.

28. The spool according to claim 27, wherein the sleeve includes at least one second region deformable for a force-locking connection to the winding wire and is adapted to provide a welded joint to the winding wire.

29. An electric motor, comprising:

a brake including a brake coil in an electromagnet, the brake coil including a spool including:

at least one bobbin, having at least one circumferential channel;

a winding wire; and at least one sleeve electrically connected to the winding wire, the sleeve electrically connected to at least one of (a) an electrical line and (b) a stranded conductor of a cable, the sleeve including at least one deformable region, the deformable region deformable to provide a force-locking connection and weldability for producing the electrical connections, the sleeve including at least one first support region arranged for at least one of (a) support and (b) guidance for the winding wire, the sleeve including at least one second region, arranged as a tab, deformable for force-locking connection to the winding wire and providable for producing a welded joint to the winding wire, the sleeve including at least one third region for a welded joint to at least one of (a) the electrical line and (b) the stranded conductor of the cable;

wherein the at least one circumferential channel is configured to accept the at least one sleeve, and the at least one sleeve is fastened to the bobbin in the channel by at least one of (a) force-locking and (b) form-locking.

30. An electric motor, comprising:

a brake including a brake coil in an electromagnet, the brake coil including a spool including:

at least one bobbin, including at least one circumferential channel;

a winding wire;

at least one sleeve is electrically connected to the winding wire, the sleeve electrically connected to an electrical line, the sleeve including at least one deformable region, to produce the electrical connection, a respectively deformable region is deformable to provide a force-locking connection and weldability;

wherein the at least one circumferential channel is configured to accept a tab of the at least one sleeve for connecting the electrical line to the sleeve, and the at least one sleeve is fastened to the bobbin in the channel by at least one of (a) force-locking and (b) form-locking, wherein the electrical line is connected to the sleeve between the tab of the at least one sleeve and a wall part area of the at least one sleeve.

* * * * *